United States Patent
Matolin et al.

(10) Patent No.: US 11,885,673 B2
(45) Date of Patent: Jan. 30, 2024

(54) PIXEL CIRCUIT INCLUDING AN OPEN-LOOP AMPLIFIER WITH WELL CONTROLLED GAIN FOR EVENT-BASED VISION SENSOR AND METHOD OF CONTROLLING THEREOF

(71) Applicant: PROPHESEE, Paris (FR)

(72) Inventors: Daniel Matolin, Freital (DE); Denis Bourke, Dalkey (IR); Christian Bouvier, Saulx les Chartreux (FR)

(73) Assignee: Prophesee, Paris (FR)

( * ) Notice: Subject to any disclaimer, the term of this patent is extended or adjusted under 35 U.S.C. 154(b) by 0 days.

(21) Appl. No.: 17/220,761

(22) Filed: Apr. 1, 2021

(65) Prior Publication Data

US 2021/0310861 A1    Oct. 7, 2021

Related U.S. Application Data

(60) Provisional application No. 63/004,110, filed on Apr. 2, 2020.

(51) Int. Cl.
  *G01J 1/42*    (2006.01)
  *G01J 1/46*    (2006.01)
  (Continued)

(52) U.S. Cl.
  CPC .............. *G01J 1/4228* (2013.01); *G01J 1/46* (2013.01); *H04N 25/766* (2023.01); *H04N 25/77* (2023.01); *H04N 25/778* (2023.01)

(58) Field of Classification Search
  CPC ...... G01J 1/4228; G01J 1/46; G01J 2001/446; G01J 1/44; H04N 5/3745; H04N 5/378;
  (Continued)

(56) References Cited

U.S. PATENT DOCUMENTS 5,198,660 A * 3/1993 Yokoyama ............... G01J 1/46
                                                      250/214 A
7,728,269 B2    6/2010 Lichtsteiner et al.
(Continued)

FOREIGN PATENT DOCUMENTS

EP         2717466 A1    4/2014
EP         16305391.1    4/2017
(Continued)

OTHER PUBLICATIONS

Jörg Kramer, "An Integrated Optical Transient Sensor", IEEE Transactions on Circuits and Systems-II: Analog and Digital Signal Processing, vol. 49, No. 9, Sep. 2002, pp. 612-628.
(Continued)

*Primary Examiner* — Jennifer D Bennett
(74) *Attorney, Agent, or Firm* — Finnegan, Henderson, Farabow, Garrett & Dunner, LLP

(57) ABSTRACT

A pixel circuit is provided for use in an image sensor. The pixel circuit includes a photosensitive element configured to generate a current signal in response to brightness of light impinging on the photosensitive element, and a converter configured to receive the current signal from the photosensitive element and generate a voltage signal based on the received current signal. The pixel circuit also includes a capacitor electrically coupled to the converter in series and configured to receive the voltage signal from the converter, and an amplifier electrically coupled, at an input, to the capacitor in series and configured to generate, at an output, an amplified signal based on an output signal from the capacitor, wherein there is no feedback between the output and the input of the amplifier. Further, the pixel circuit includes a reset device configured to reset the amplifier in response to a trigger signal being generated.

44 Claims, 13 Drawing Sheets

(51) Int. Cl.
    *H04N 25/77*     (2023.01)
    *H04N 25/778*    (2023.01)
    *H04N 25/766*    (2023.01)

(58) Field of Classification Search
    CPC .... H04N 25/766; H04N 25/77; H04N 25/778; H01L 27/14609; G01S 17/894; G01S 7/4863; G01S 17/89
    See application file for complete search history.

(56) References Cited

U.S. PATENT DOCUMENTS

| | | | |
|---|---|---|---|
| 8,780,240 B2 | 7/2014 | Posch et al. | |
| 9,681,081 B2 | 6/2017 | Serrano Gotarredona et al. | |
| 9,967,479 B2 | 5/2018 | Matolin et al. | |
| 9,998,698 B1 * | 6/2018 | Xue | H04N 5/3575 |
| 2015/0194454 A1 | 7/2015 | Kim et al. | |
| 2016/0227135 A1 * | 8/2016 | Matolin | H04N 5/378 |

FOREIGN PATENT DOCUMENTS

| | | | |
|---|---|---|---|
| EP | 3313064 A1 | | 4/2018 |
| EP | 3440833 B1 | | 8/2019 |
| JP | H11214740 A | * | 8/1999 |
| WO | WO 2015/036592 A1 | | 3/2015 |
| WO | WO 2017/174579 A1 | | 10/2017 |

OTHER PUBLICATIONS

Oliver Landolt et al., "Visual Sensor with Resolution Enhancement by Mechanical Vibrations", Proceedings 2001 Conference on Advanced Research in VLSI, Mar. 2001, pp. 249-264.
Juan A. Leñero-Bardallo et al., "A 3.6 µS Latency Asynchronous Frame-Free Event-Driven Dynamic- Vision-Sensor", IEEE Journal of Solid-State Circuits, vol. 46, No. 6, Jun. 2011, pp. 1443-1455.
Chenghan Li et al., "A 132 by 104 10µm-Pixel 250µW 1kefps Dynamic Vision Sensor with Pixel-Parallel Noise and Spatial Redundancy Suppression", 2019 Symposium on VLSI Circuits Digest of Technical Papers.
Patrick Lichtsteiner, et al., "A 128×128 120 dB 30mw Asynchronous Vision Sensor That Responds to Relative Intensity Change", 2006 IEEE International Solid-State Circuits Conference, Digest of Technical Papers, Feb. 2006, pp. 2060-2069.
Patrick Lichtsteiner, et al., "A 128×128 120 dB 15 µs Latency Asynchronous Temporal Contrast Vision Sensor", IEEE Journal of Solid-State Circuits, vol. 43, No. 2, Feb. 2008, pp. 566-576.
Bongki Son et al., "A 640×480 Dynamic Vision Sensor with a 9µm Pixel and 300Meps Address-Event Representation", 2017 IEEE International Solid-State Circuits Conference, Digest of Technical Papers, Feb. 2017, pp. 66-67.
International Search Report and Written Opinion, International Application No. PCT/EP2021/058767 for PROPHESEE, dated May 17, 2021 (15 pages).

* cited by examiner

PIXEL CIRCUIT INCLUDING AN OPEN-LOOP AMPLIFIER WITH WELL CONTROLLED GAIN FOR EVENT-BASED VISION SENSOR AND METHOD OF CONTROLLING THEREOF

CROSS-REFERENCE TO RELATED APPLICATION(S)

This application claims priority to U.S. Provisional Patent Application No. 63/004,110, filed on Apr. 2, 2020, the content of which is incorporated by reference herein in its entirety.

TECHNICAL FIELD

The present disclosure relates generally to the field of sensors and pixel circuits for sensing. More specifically, and without limitation, this disclosure relates to systems and methods for providing pixel circuits and architectures, and implementing and using vision sensors with pixel circuits. The sensors and techniques disclosed herein may be used in various applications and vision systems, such as security systems, autonomous vehicles, and other systems that benefit from rapid and efficient motion detection and/or motion event-driven data acquisition.

BACKGROUND

Extant image sensors use a plurality of pixels comprising semiconductor charge-coupled devices (CCD), complementary metal-oxide-semiconductor (CMOS) sensors, N-type metal-oxide-semiconductor (NMOS) sensors, or other sensors in order to capture digital images of scenes. However, conventional image sensors are slow at detecting rapid motion because each frame is captured as a full image of the scene. Moreover, such image sensors produce large amounts of data, exponentially increasing the amount of processing required to sift out, for example, motion information from the captured images.

Many systems do not require the vast detail provided by existing image sensors that capture full images. For example, security systems and other monitoring systems may only be interested in motion data and not in portions of the image having no motion. As another example, autonomous vehicles must process captured data quickly and efficiently in order to make decisions comparable with human perception time (generally on the order of 100 milliseconds or less). Such efficiency is capped when large amounts of data must be discarded (e.g., via post-processing) in order to obtain the portion of captured data relevant to the situation.

SUMMARY

Embodiments of the present disclosure may provide a sensor that includes a plurality of pixels. Each pixel includes a photosensitive element configured to generate a current signal in response to brightness of light impinging on the photosensitive element; a converter configured to receive the current signal from the photosensitive element and generate a voltage signal based on the received current signal; a capacitor electrically coupled to the converter in series and configured to receive the voltage signal from the converter; an amplifier electrically coupled, at an input, to the capacitor in series and configured to generate, at an output, an amplified signal based on an output signal from the capacitor, wherein there is no feedback between the output and the input of the amplifier; and a reset device electrically coupled between the input and the output of the amplifier and configured to reset the amplifier in response to a trigger signal being generated.

In some embodiments, the sensor comprises at least one temporal contrast sensor, also referred to as a contrast detection sensor or a dynamic vision sensor. Further, the amplifier may have a defined gain and, in some embodiments, the amplifier comprises a controlled-gain amplifier. In some embodiments, the gain of the amplifier may be controllable or adjustable and, in other embodiments, the gain of the amplifier is not controllable or adjustable. In some embodiments, the gain of the amplifier may be defined by the number of stacked transistors of the amplifier, which is not adjustable. In other embodiments, the gain of the amplifier is controllable by switching in or out stacked transistors. In some embodiments, the gain of the amplifier is controllable by switching in or out amp stages, as disclosed herein.

As disclosed herein, embodiments of the amplifier may comprise a controlled-gain amplifier. The controlled-gain amplifier may include a plurality of stacked transistors. In some embodiments, the plurality of stacked transistors includes a transistor, and a gate of the transistor is electrically coupled to a drain or a source of the transistor. One or more of such transistors may be used to implement the plurality of stacked transistors.

In some embodiments, an open-loop gain of the amplifier is associated with a number related to the number of stacked transistors. By way of example, in some embodiments, the gain of the amplifier is less than 10. In other embodiments, the gain is equal to or greater than 10. In other embodiments, the gain of the amplifier is equal to or greater than 20 and equal to or less than 40. In still further embodiments, the gain of the amplifier is less than 100. Further, in some embodiments, the amplifier is implemented as a multi-stage amplifier, as disclosed herein.

In some embodiments, the pixel further comprises a comparator electrically coupled to the output of the amplifier and configured to generate the trigger signal when the amplified signal matches a condition. In some embodiments, the condition comprises that a magnitude of the amplified signal is greater than or equal to a threshold value.

In some embodiments, the reset device comprises a switch. As disclosed herein, the reset device may be configured to reset the voltage between the input and the output of the amplifier by closing the switch. The reset device may be further configured to reset the amplifier by setting a voltage between the input and the output of the amplifier to zero.

In some embodiments, the pixel further comprises a comparator electrically coupled to the output of the amplifier and configured to generate the trigger signal when the amplified signal matches a condition. In some embodiments, the comparator is configured to output the trigger signal to an external readout system. The external readout system may be configured to send an acknowledge signal to the pixel in response to the trigger signal. In some embodiments, the reset device may be configured to reset the amplifier in response to the receipt of the acknowledge signal. In other embodiments, the reset device may be configured to reset the amplifier after providing the trigger signal as output to the external readout system. That is, the pixel does not require receiving an acknowledge signal from the external readout system to reset itself.

Consistent with embodiments of the present disclosure, each pixel may also include another capacitor electrically coupled in series between the output of the amplifier and an input of the comparator, and another reset device electrically coupled to the input of the comparator and configured to set a reference signal as the input of the comparator. In some embodiments, the another reset device comprises another switch. In some embodiments, the another reset device is further configured to set the reference signal as the input of the comparator by closing the another switch. In some embodiments, the reset device comprises a switch that is different from the another switch of the another reset device.

In some embodiments, the reference signal comprises a reference voltage.

Consistent with embodiments of the present disclosure, each pixel may also include a delay circuit electrically coupled between the switch and the another switch and configured to set a temporal delay between operating the switch and the another switch (e.g., a temporal delay between operating a first switch and a second switch). As will be appreciated from the present disclosure, the number of switches is not limited to the examples provided herein.

Embodiments of the present disclosure may also provide a pixel circuit for use in a vision sensor. The pixel circuit may include a photosensitive element configured to generate a current signal in response to brightness of light impinging on the photosensitive element; a converter configured to receive the current signal from the photosensitive element and generate a voltage signal based on the received current signal; a capacitor electrically coupled to the converter in series and configured to receive the voltage signal from the converter; an amplifier electrically coupled, at an input, to the first capacitor in series and configured to generate, at an output, an amplified signal based on an output signal from the capacitor, wherein there is no feedback between the output and the input of the amplifier; and a reset device electrically coupled between the input and the output of the amplifier and configured to reset the amplifier when a trigger signal is generated.

Embodiments of the present disclosure may further provide a method for controlling a sensor having a plurality of pixels. The method includes receiving a current signal in response to light impinging on a photosensitive element; converting the current signal to a voltage signal based on the current signal; generating a decoupled voltage signal by a capacitor based on the voltage signal, wherein the decoupled voltage signal is decoupled from the current signal; generating an amplified signal by an amplifier based on the decoupled voltage signal, wherein there is no capacitive feedback between the amplified signal and the decoupled voltage signal; generating a trigger signal when the amplified signal matches a condition; and resetting the amplifier when the trigger signal is generated.

BRIEF DESCRIPTION OF THE DRAWINGS

The accompanying drawings, which comprise a part of this specification, illustrate various embodiments and, together with the description, serve to explain the principles and features of the disclosed embodiments. In the drawings.

DETAILED DESCRIPTION

Figure 1A:
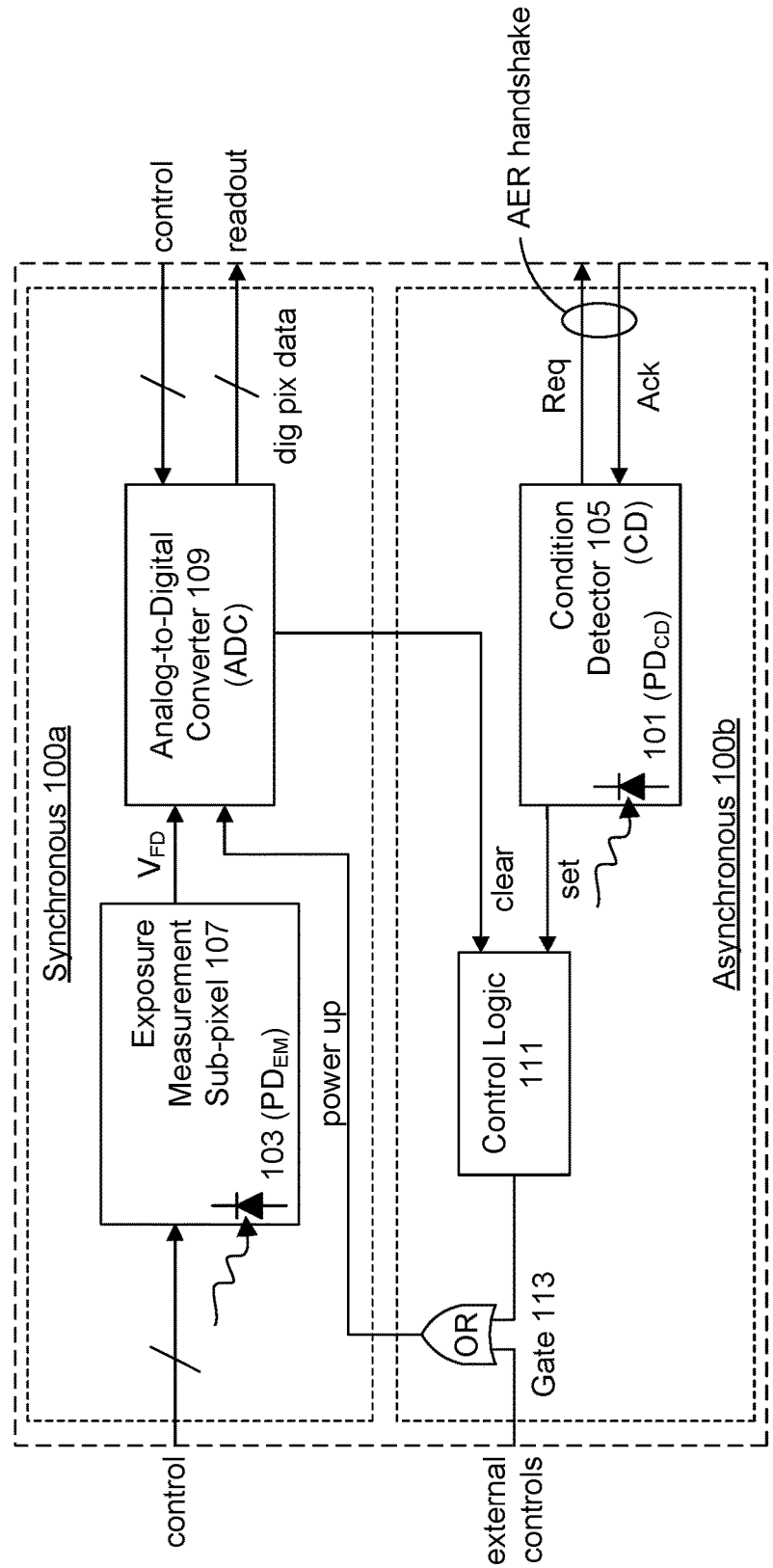
FIG. 1A is a schematic representation of an exemplary super pixel, according to embodiments of the present disclosure.

The disclosed embodiments relate to systems and methods for vision sensing, including asynchronous, time-based sensing. The disclosed embodiments also relate to pixels and pixel circuits, and implementing and using vision sensors with such pixels and pixel circuits. Advantageously, the exemplary embodiments can provide fast and efficient sensing. Further advantages of the present embodiments include the ability to optimally use advanced semiconductor fabrication process technologies for implementing a vision sensor with competitive pixel sizes. Still further, embodiments of the present disclosure may be implemented and used in various applications and vision systems, such as security systems, autonomous vehicles, and other systems that benefit from rapid and efficient motion or event detection. Although embodiments of the present disclosure are described with general reference to a vision system, it will be appreciated that such a system may part of a camera, a LIDAR, or other sensor system.

In extant image or video processing systems, image sensors may acquire and process visual information in order to reconstruct images. An image or video acquisition and processing system can include an array of photosensors, each of which may acquire visual information in order to reconstruct an image representation of the visual scene. This process may be repeated at a predetermined rate.

Event-based vision sensors can pixel-individually detect temporal contrast exceeding a preset relative threshold to follow the temporal evolution of relative light changes (contrast detection, CD; temporal contrast, TC) and to define sampling points for frame-free pixel-level measurement of absolute intensity (exposure measurement, EM). Vision sensors have gained popularity in high-speed, low-power machine vision applications thanks to temporal precision of recorded data, inherent suppression of temporal redundancy resulting in reduced post-processing cost, and wide intra-scene dynamic range operation. Information about temporal contrast (TC) can be encoded in the form of "events": data packets containing the originating pixel's X,Y coordinate, time stamp, and contrast polarity. To maximally benefit from the ability of the individual pixel to sample visual information at high temporal precision, early time-stamping and high readout throughput can be crucial to preserve event timings.

In some embodiments, for real-time artificial vision (also referred to as "computer vision" or "machine vision"), a vision acquisition and processing system can be configured to acquire and process only data representing a change of current visual information with respect to previously acquired visual information. Such sensors or vision systems may not generate frames of images. Such visual sensors can include, for example, a temporal contrast (TC) sensor, also known as a contrast detection (CD) sensor, or a dynamic vision sensor (DVS). Such sensors are referred to as "event-based vision sensors" or generally a "vision sensor" in this disclosure.

For example, a TC sensor does not record image by frames like extant image systems. Instead, each pixel of the TC sensor can determine a time derivative of the light it senses. In some embodiments, optionally, the pixel can further perform some processing on the time derivative. When the time derivative exceeds a preset threshold value, the pixel can generate an "event" by outputting a signal. With short latency, the pixel can further transmit data related to the event. In some embodiments, the transmitted data can include a location (e.g., x- and y-coordinate) of the pixel located within the TC sensor (e.g., having a two-dimensional pixel matrix). In some embodiments, the transmitted data can include with a sign bit representing polarity (e.g., positive or negative sign) of temporal evolution of light intensity sensed by the pixel. In some embodiments, the transmitted data can include a timestamp of occurrence of the event. In some embodiments, the transmitted data of the pixel can include a flow of (x,y,s) values, in which x and y represent the coordinates of the pixel and s represents the polarity. The value of s may represent a relative change of the light intensity detected by the pixel, in which the value of s can represent the magnitude of the change, and the sign of s can represent the direction of the change (e.g., increasing or decreasing). In some embodiments, the pixel circuit of the TC sensor may operate asynchronously in which the pixel circuit of the TC sensor are not typically quantized to a time-base (e.g., not clocked). In other embodiments, the pixel circuit of the TC sensor may operate synchronously, in which the pixel circuit of the TC sensor are quantized to a time-base (e.g., clocked).

As described above, vision sensors may include a temporal contrast (TC) sensor, also known as a contrast detection (CD) sensor or a dynamic vision sensor (DVS). Vision sensors can be implemented in many different ways, including with or without exposure measurement (EM), and with or without other operations or components, including an analog-to-digital converter (ADC). The number of components can also vary (e.g., one versus multiple EMs), as well as the component location (e.g., in pixel versus external). Furthermore, it is possible for the components to work asynchronously or synchronously, or have a combination of both. The specific arrangement and types of operations will often depend on the application and requirements of the vision sensor.

Embodiments of the present invention provide a pixel circuit and features that can advantageously be used in any vision sensor. By way of example, and without limitation, a vision sensor implemented with a TC sensor having a two-dimensional pixel matrix can incorporate embodiments of the present invention and its related features. By way of further example, vision sensors using super pixels can incorporate embodiments of the present invention and its related features. Exemplary super pixels are described below with reference to FIGS. 1A-1D. It will be appreciated the following description of super pixels is merely exemplary and other forms of vision sensors may be utilized with embodiments of the invention. Indeed, as noted above, embodiments of the present invention may be advantageously incorporated into any type of vision sensor.

FIG. 1A is a schematic representation of an exemplary super pixel 100A, consistent with embodiments of the present disclosure. In some embodiments, a super pixel may be larger or include more components than a conventional "pixel" because it may include two or more photosensitive elements, e.g., elements 101 and 103, as well as a condition detector 105, an ADC 109 and control and communication logic, such as 111, 113.

A photosensitive element may comprise a photodiode (e.g., a p-n junction or PIN structure) or any other element configured to convert light into an electrical signal. Each photodiode (e.g., element 101 or element 103) may generate a current (e.g., $I_{ph}$) based on the intensity of the light impinging on the photodiode. For example, the current $I_{ph}$ is generated in proportion to the intensity of the light impinging on the photodiode.

As shown in the example of FIG. 1A, the super pixel includes a synchronous unit 100a and an asynchronous unit 100b. The asynchronous unit 100b may include a photosensitive element 101 ($PD_{CD}$, e.g., a photodiode), and the synchronous unit 100a may include at least one photosensitive element 103 ($PD_{EM}$, e.g., a photodiode).

The asynchronous unit 100b may further include a condition detector 105 (CD). As shown in the example of FIG. 1A, the detector 105 is electrically connected to a first photosensitive element 101 ($PD_{CD}$) and is configured to generate a trigger signal (labeled "set" in the example of FIG. 1A) when an analog signal brightness of light impinging on the first photosensitive element 101 matches a condition. For example, the condition may comprise whether the analog signal exceeds a threshold (e.g., a voltage level or a current level). The analog signal may comprise a voltage signal or a current signal.

The synchronous unit 100a may include an exposure measurement sub-pixel 107. The exposure measurement sub-pixel 107 may be configured to generate an analog measurement based on the brightness of light impinging on a second photosensitive element 103 ($PD_{EM}$). Although depicted as a voltage signal $V_{FD}$ in FIG. 1A, the analog measurement may alternatively comprise a current signal. The synchronous unit 100a may further include an analog-to-digital converter (ADC) 109 for converting the analog measurement to digital data (labeled "dig pix data" in the example of FIG. 1A). The combination of the exposure measurement sub-pixel 107 and the ADC 109 may be referred to as "an exposure measurement circuit." Accordingly, the exposure measurement circuit may be electrically connected to the second photosensitive element 103 ($PD_{EM}$) and configured to convert an analog signal based on the brightness of light impinging on the second photosensitive element 103 to a digital signal. Unlike the asynchronous unit 100b, which outputs based on the condition detected by condition detector CD, the synchronous unit 100a may be clocked, e.g., such that digital data is output from the ADC only according to a clock cycle. In some embodiments, the exposure measurement sub-pixel 107 may also be clocked such that the signal from the second photosensitive element 103 ($PD_{EM}$) is converted to an analog signal only according to the clock cycle.

As further shown in FIG. 1A, upon detection of the condition, condition detector 105 (CD) may send a signal (labeled "set" in the example of FIG. 1A) to a control logic 111 forming part of asynchronous unit 100b. The control logic 111 may trigger a switch (not shown) and/or a logic gate 113 (depicted as an "OR" gate in the example of FIG. 1A) to enable (or "power up" as depicted in the example of FIG. 1A) the ADC 109. As used herein, "enable" may refer to an activation such that ADC 109 may use incoming ADC control signals, ramp codes, or the like to perform the conversion. Accordingly, the ADC control signals, ramp codes, and the like may be continuously input into ADC 109 for use upon enablement.

The combination of the control logic 111 and the switch (not shown) and/or logic gate 113 may be referred to as a "logic circuit." Accordingly, the logic circuit may be electrically connected to the detector 105 and the exposure measurement circuit and configured to enable the exposure measurement circuit (or, in particular, the ADC 109 of the exposure measurement circuit) in response to the trigger signal (labeled "set" in the example of FIG. 1A) and to disable the exposure measurement circuit (or, in particular, the ADC 109 of the exposure measurement circuit) when the digital signal (labeled "dig pix data") is read out from the exposure measurement circuit. In some embodiments, the logic circuit may temporarily enable the exposure measurement circuit (or, in particular, the ADC 109 of the exposure measurement circuit) such that the exposure measurement circuit (or, in particular, the ADC 109 of the exposure measurement circuit) automatically disables after outputting the digital signal.

Accordingly, after reading out the digital data to an external readout system (not shown), the ADC 109 may generate a reset signal (labeled "clear" in the example of FIG. 1A) that is sent to the control logic 111. The control logic 111 may thus trigger the switch (not shown) and/or the logic gate 113 to disable (or "power down" as depicted in the example of FIG. 1A) the ADC 109. As used herein, "disable" may refer to a deactivation such that ADC 109 uses incoming ADC control signals, ramp codes, or the like to perform the conversion. However, the ADC control signals, ramp codes, and the like may still be input into ADC 109 after disablement.

In some embodiments, the logic circuit of control logic 111 may temporarily enable the synchronous unit 100a (or, in particular, the ADC 109 of the synchronous unit 100a) such that the synchronous unit 100a (or, in particular, the ADC 109 of the synchronous unit 100a) automatically disables after outputting the digital signal. For example, the reset signal (labeled "clear" in the example of FIG. 1A) may be sent from the ADC 109 to the logic circuit of control logic 111 after being enabled by the logic circuit in response to the trigger signal (labeled "set" in the example of FIG. 1A) such that the logic circuit becomes ready to receive a new "set" signal from the condition detector 105.

As further shown in FIG. 1A, the condition detector 105 (CD) may communicate the trigger signal to the external readout system (shown as "Req" in the example of FIG. 1A). The condition detector 105 (CD) may receive an acknowledge signal (shown as "Ack" in the example of FIG. 1A) that is then used to reset the condition detector 105 (CD) such that the condition may again be detected and the trigger generated. In some embodiments, the external readout system may also send control signals to the exposure measurement sub-pixel 107 and/or the ADC 109. All communications with the external readout system may be governed by a protocol, such as an address-event representation (AER) protocol and/or may be governed by clock cycles. Accordingly, the external readout system may comprise an event readout system configured to read data from the super pixels asynchronously and/or may comprise a clocked readout system configured to read data from the super pixels during predetermined clock cycles.

As further shown in FIG. 1A, external controls may also be provided to the switch (not shown) and/or the logic gate 113 (or to the control logic 111) in order to activate a readout. For example, if the super pixel 100A has not returned a readout after a threshold number of clock cycles (e.g., if the condition has not been met after the threshold number of clock cycles), the external readout system may send a control signal to force a readout. Additionally, or alternatively, the external readout system may operate in a standard frame mode such that the super pixels or at least a group of super pixels (e.g., super pixel 100A) are triggered in order to capture a full or partial frame regardless of whether the condition is detected.

Figure 1B:
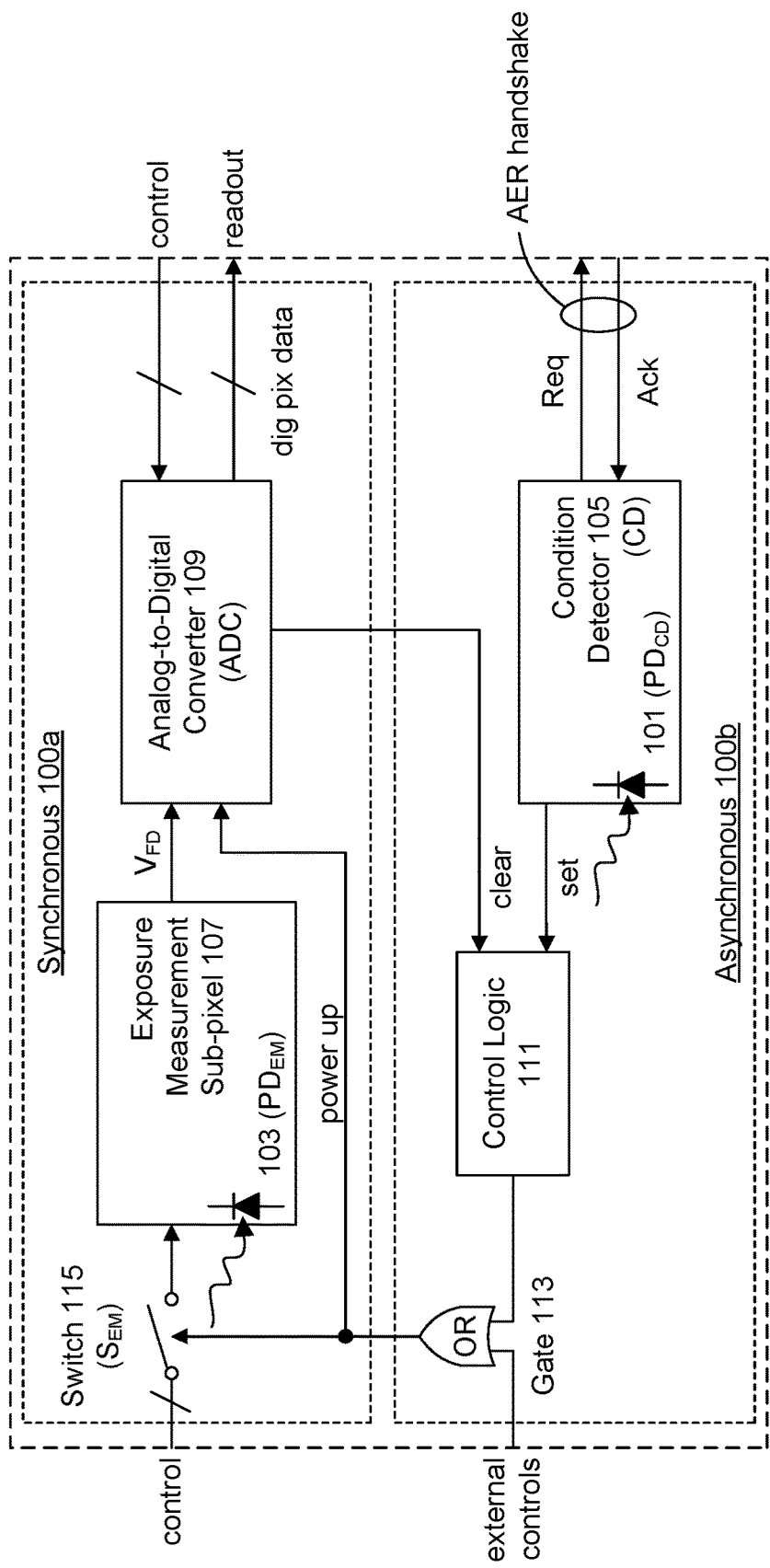
FIG. 1B is a schematic representation of another exemplary super pixel, according to embodiments of the present disclosure.

FIG. 1B is another exemplary super pixel 100B, consistent with embodiments of the present disclosure. The super pixel 100B of FIG. 1B functions similarly to the super pixel 100A of FIG. 1A, but further includes a switch 115 (SEM) along with the OR gate 113 in the control circuit. Accordingly, using external control signal applied to switch 115, the super pixel 100B of FIG. 1B may also suppress the exposure measurement sub-pixel 107 whenever the ADC 109 is disabled.

Figure 1C:
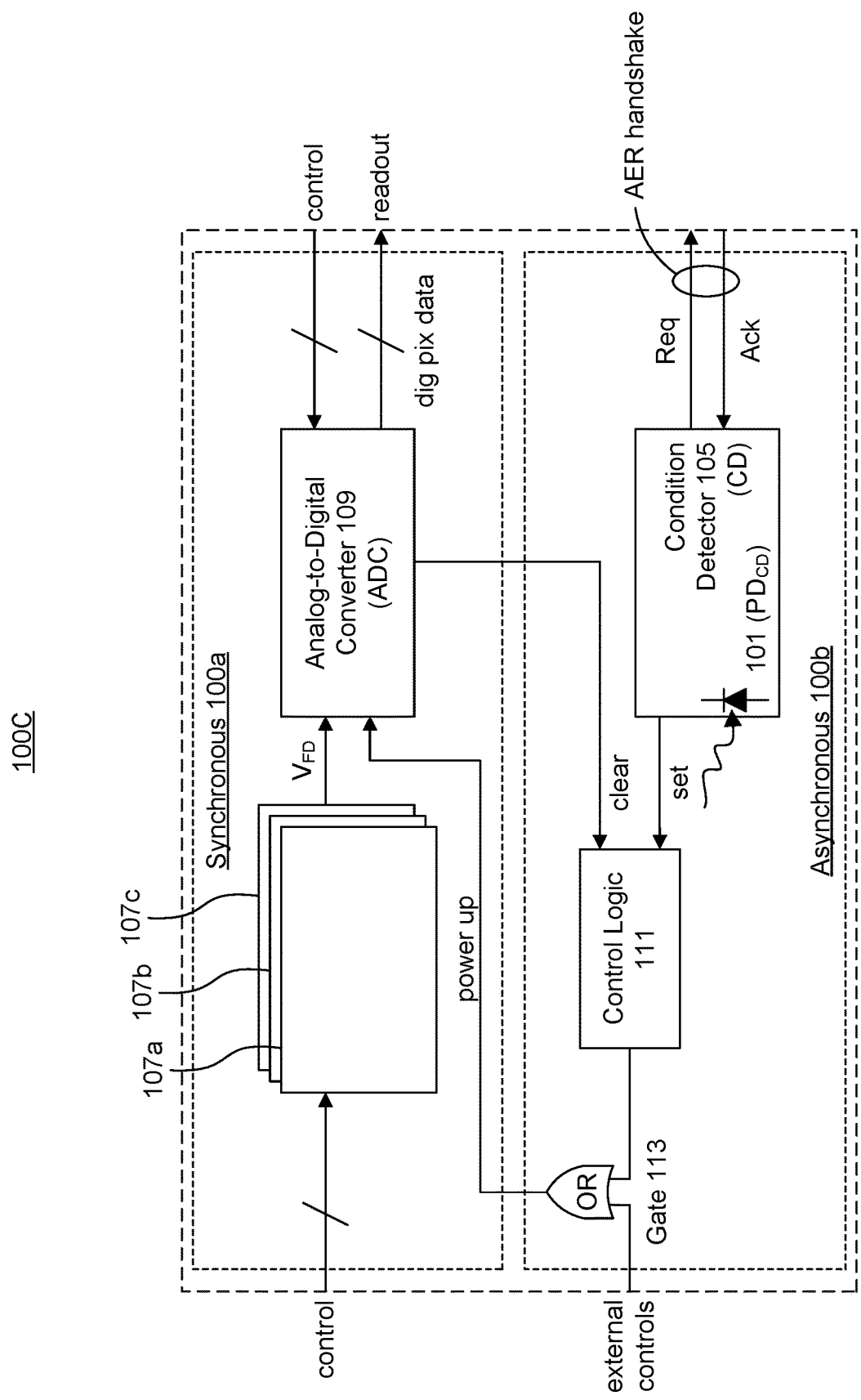
FIG. 1C is a schematic representation of yet another exemplary super pixel, according to embodiments of the present disclosure.

FIG. 1C depicts yet another exemplary super pixel 100C, consistent with embodiments of the present disclosure. The super pixel 100C of FIG. 1C functions similarly to the super pixel 100A of FIG. 1A, but further includes a plurality of exposure measurement sub-pixels, e.g., sub-pixels 107a, 107b, and 107c. Although depicted with three exposure measurement sub-pixels, the embodiment depicted in FIG. 1C may be implemented with any number of sub-pixels paired with ADC 109. Accordingly, the embodiment of FIG. 1C may allow for more accurate data to be captured, e.g., by averaging, summing, or otherwise combining the measurements from the plurality of exposure measurement sub-pixels before converting the combined measurement to the digital signal. Additionally, or alternatively, the measurements from the plurality of exposure measurement sub-pixels may be converted to digital signals sequentially to achieve a higher resolution.

Figure 1D:
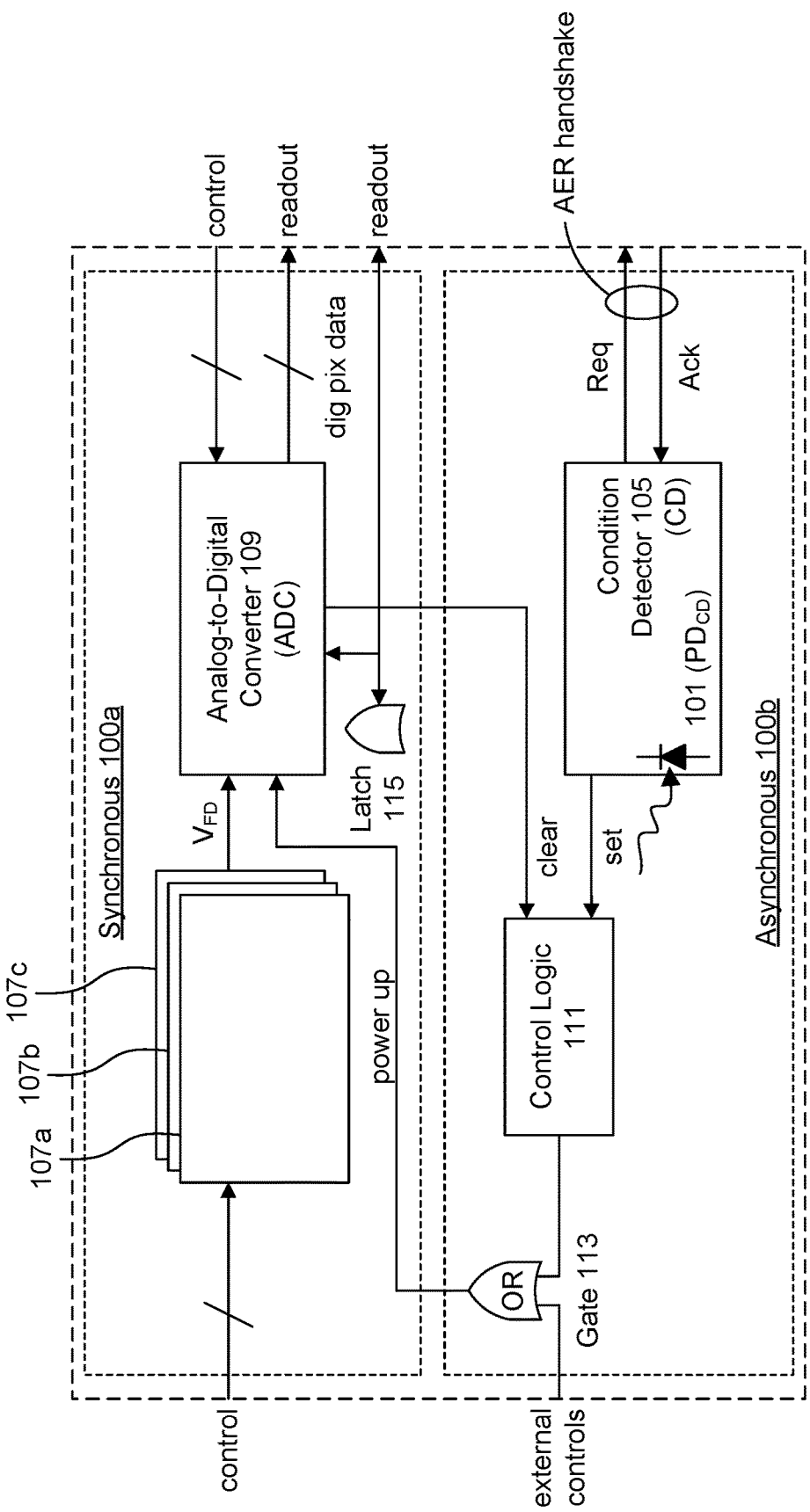
FIG. 1D is a schematic representation of a still further exemplary super pixel, according to embodiments of the present disclosure.

FIG. 1D depicts yet another exemplary super pixel 100D, consistent with embodiments of the present disclosure. The super pixel 100D of FIG. 1D functions similarly to the super pixel 100C of FIG. 1C, but further includes a latch 115. Latch 115 may, for example, comprise a switch (e.g., one or more transistors configured to function as a switch), one or more bits of static random-access memory (SRAM), or the like. Although depicted as separate from the ADC 109, in some embodiments, latch 115 may comprise at least one latch of n-bit latches provided in ADC 109 (e.g., as described below with respect to ADC 300 of FIG. 3A).

In one embodiment, the trigger signal (labeled "set" in the example of FIG. 1D) may cause control logic 111 to activate during a first cycle N−1. In response, the control logic 111 may send an enablement signal (labeled "power up" in the example of FIG. 1D) to ADC 109. In response, ADC 109 may begin conversion of an analog signal from one or more exposure measurement sub-pixels (e.g., sub-pixels 107*a*, 107*b*, and 107*c*) in a second cycle N. Additionally, ADC 109 may set latch 115 and send a signal to control logic 111 (labeled "clear" in the example of FIG. 1D) at or before beginning cycle N such that control logic 111 is ready to generate a new trigger signal any time during cycle N. Accordingly, a new exposure/conversion becomes possible already in a third cycle N+1, as depicted in the example of FIG. 12 and explained further below. Latch 115 is further connected to the readout system (e.g., over the "dig pixel data" bus depicted in FIG. 1D) in order to signal the readout system to perform a read out at the end of cycle N. Accordingly, when the readout system pulls the digital signal from ADC 109 at the end of cycle N, latch 115 may be cleared by ADC 109.

In another embodiment, rather than sending the "power up" signal to ADC 109, control logic 111 may activate latch 115. In such embodiments, ADC 109, at the beginning of each cycle, may poll the status of latch 115 to determine whether to perform a conversion in the cycle. In embodiments where ADC 109 disables rather than operates continuously, ADC 109 may disable for a cycle if latch 115 is not activated at the start of said cycle. If ADC 109 polls latch 115 and latch 115 is enabled, ADC 109 may clear latch 115 and begin conversion of an analog signal from one or more exposure measurement sub-pixels (e.g., sub-pixels 107*a*, 107*b*, and 107*c*). In such embodiments, ADC 109 may further set an internal status bit to notify the readout system to perform a read out at the end of the cycle. After the readout, ADC 109 may disable itself and, at the beginning of the next cycle, again poll latch 115 to determine whether to re-enable for another cycle. Alternatively, ADC 109 may poll latch 115 before disabling to determine whether to stay enabled for another conversion or to disable.

In another embodiment (not depicted in FIG. 1D), latch 115 may be external to super pixel 100D. In such embodiments, super pixel 100D may exclude control logic 111. Instead, detector 105 may activate latch 115 in response to the condition being satisfied, and ADC 109 may continuously perform a conversion each cycle. Accordingly, the readout system may use latch 115 to determine whether to perform a read out at the end of each cycle. Otherwise, a conversion performed by ADC 109 may be deleted without being read out. Although such an embodiment may use additional power for each ADC cycle, super pixel 100D may be made smaller by eliminated control logic 111 and using a smaller array of external latches such as latch 115.

In embodiments where latch 115 is external to super pixel 100D, latch 115 may be connected to super pixel 100D using at least one of a direct wiring connection or one or more arbiters. For example, latch 115 may form part of an array of external latches such that the one or more arbiters may associate a memory address of latch 115 with an address of a corresponding super pixel (e.g., super pixel 100D).

Although depicted with three exposure measurement sub-pixels (e.g., sub-pixels 107*a*, 107*b*, and 107*c*), the embodiment depicted in FIG. 1D may be implemented with any number of sub-pixels paired with ADC 109, e.g., one sub-pixel, two sub-pixels, four sub-pixels, etc.

The exemplary super pixels 100A, 100B, 100C and 100D of FIGS. 1A, 1B, 1C, and 1D, respectively, may be arranged in one or more arrays to form one or more vision sensors. For example, a vision sensor may include a plurality of super pixels arranged in one or more rows and one or more columns with respective row and column clock circuits for readout of digital data from the ADCs to the external readout system. In another example, the super pixels may be arranged in a star pattern with clock circuits for each node of the star for readout of digital data from the ADCs to the external readout system.

Extant pixel circuits for a vision sensor may by implemented with a switched capacitor amplifier for amplifying detected signals. The switched capacitor amplifier may include a high-gain amplifier (e.g., with gains of hundreds or thousands) electrically connected to a first capacitor at an input to the high-gain amplifier, and a feedback loop between the input and output of high-gain amplifier, wherein the feedback loop includes a second capacitor. The gain of such a switched capacitor amplifier will generally depend on the ratio of the capacitance of the first capacitor to the capacitance of the second capacitor. In order to achieve the required amplification gain (e.g., with magnitude being of the order of 20), the first capacitor must be designed to have a capacitance much larger (e.g., 20 times) than that of the second capacitor, which itself must be designed according to minimum size rules for fabrication. Overall, this switched capacitor amplifier arrangement leads to significant demands on capacitor size, limiting the possibility to downscale the area consumed by such a pixel circuit in an integrated circuit chip implementation.

For fabrication of the sensor, it would be advantageous to minimize the size of the capacitors in each pixel circuit. However, due to the size limitation of the first capacitor in the above approach, the switched capacitor amplifier may not be able to be further downsized. Thus, the space consumed by the pixel circuit may be too large for further increasing the pixel density in a vision sensor. Some extant solutions replace the switched capacitor amplifier and use complex feedback loops. However, such an approach requires a large number of components, which also set limitations to size and scalability of the pixel array. Further, extant solutions may have complex biasing requirements at pre-amp stages, which may limit the dynamic range of the amplifier.

Embodiments of the present disclosure provide pixel circuits that allow optimal utilization of advanced semiconductor fabrication process technologies for implementing a vision sensor with competitive pixel sizes. This can greatly improve the pixel circuit scalability and reduce circuit complexity. The inventive pixel circuits disclosed herein use a feedback-less configuration and an amplifier with a defined gain (that is or is not adjustable), example embodiments of which are provided in the following description.

The below described embodiments of pixel circuits that use the feedback-less configuration and a defined-gain amplifier may be applied to any vision sensor. The circuits described in FIGS. 1A-1D provide examples of such a vision sensor but do not impose any limitation to the type of vision sensors that may implement embodiments of the present disclosure. Thus, as explained above, embodiments of the present disclosure may be applied to any vision sensor without regard to whether such vision sensor uses superpixels (e.g., as described in FIGS. 1A-1D). Moreover, embodiments of the present disclosure may be applied to any vision sensor without regard to whether such vision sensor performs exposure measurement, whether such vision sensor operates synchronously or asynchronously, or whether such vision sensor uses an ADC or other components.

Figure 2:
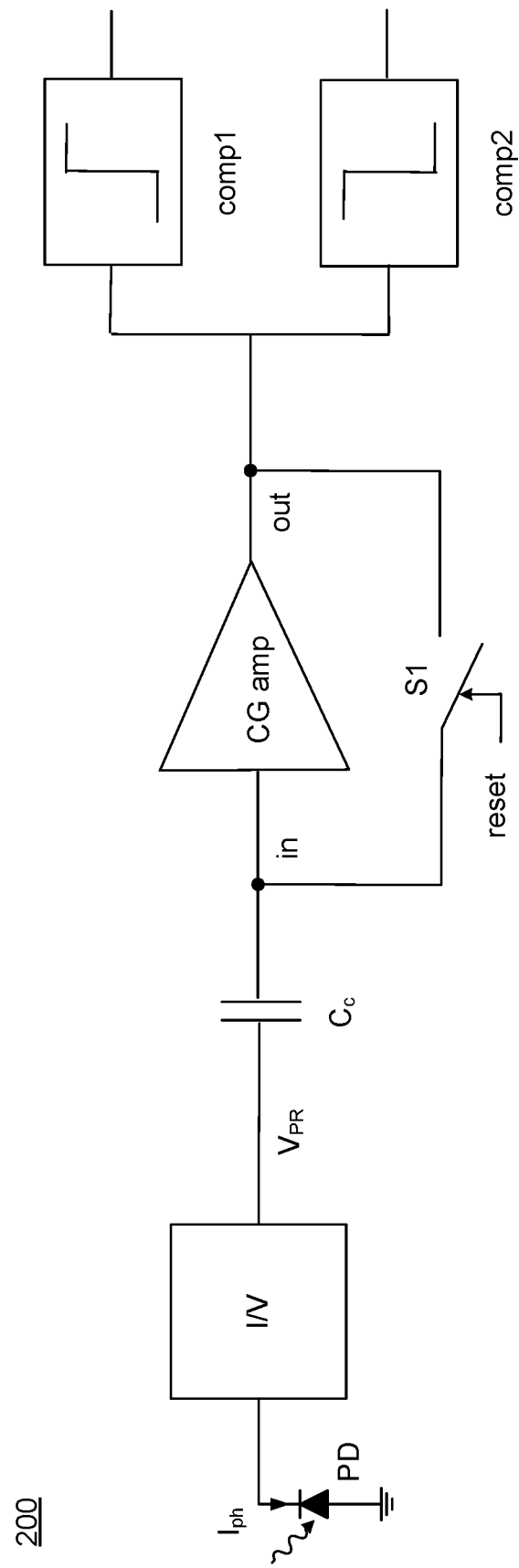
FIG. 2 is a schematic representation of an exemplary pixel circuit, according to embodiments of the present disclosure.

FIG. 2 is a schematic representation of an exemplary pixel circuit 200, according to embodiments of the present disclosure. In some embodiments, pixel circuit 200 may be implemented as part of a super pixel as shown and described in FIGS. 1A-1D, as a non-limiting example. Similar to pixel circuit 100A, pixel circuit 200 may be used in a vision sensor (e.g., a temporal contrast sensor).

Pixel circuit 200 may output data when a change occurs in the light intensity detected by the photodetector. As shown in FIG. 2, pixel circuit 200 includes a photosensitive element (e.g., a photodetector, labeled as "PD") that generates a current signal (labeled as "$I_{ph}$") in response to brightness of light impinging thereon. Pixel circuit 200 also includes a converter (e.g., a current-to-voltage converter, labeled as "I/V") that receives $I_{ph}$ from PD and generates a voltage signal (labeled as "$V_{PR}$") based on (e.g., proportional to or in logarithmic relation to) the current signal $I_{ph}$. Pixel circuit 200 further includes a capacitor (labeled as $C_c$) electrically coupled to I/V in series, which receives $V_{PR}$ from I/V. Pixel circuit 200 further includes an amplifier, e.g., a controlled-gain amplifier (labeled as "CG amp") electrically coupled to the capacitor $C_c$ at an input (labeled as "in") in series. CG amp generates, at an output (labeled as "out"), an amplified signal based on an output signal from $C_c$. While a controlled-gain amplifier is illustrated in and described for FIG. 2, it will be appreciated from this disclosure that it is a non-limiting example. In some embodiments, the gain of the amplifier may be controllable or adjustable and, in other embodiments, the gain of the amplifier is not controllable or adjustable. In some embodiments, the gain of the amplifier may be defined by the number of stacked transistors of the amplifier, which is not adjustable. In other embodiments, the gain of the amplifier is controllable by switching in or out stacked transistors. In some embodiments, the gain of the amplifier is controllable by switching in or out amp stages, as further disclosed herein.

Pixel circuit 200 may further include one or more comparators. For example, in FIG. 2, two comparators are shown, labeled as "comp1" and "comp2". Each comparator is electrically coupled to the output ("out") of CG amp. Each comparator generates a trigger signal when the amplified signal matches a condition. In some embodiments, the condition may include a magnitude of the amplified signal generated by CG amp being greater than or equal to a threshold value. For example, comp1 or comp2 may compare the amplified signal with the threshold value and generate the trigger signal with polarity (e.g., positive or negative) when the amplified signal is greater than or equal to the threshold value. In some embodiments, the threshold value may be preset to represent the minimum change needed for defining a detected event. When comp1 or comp2 outputs the trigger signal, it may represent that a change of light intensity detected by PD exceeds the minimum change required to be defined as a detected event. In some embodiments, comp1 or comp2 may output the trigger signal to an external readout system (not shown in FIG. 2).

It should be noted that, although pixel circuit 200 in FIG. 2 includes comp1 and comp2, in some embodiments, comp1 and comp2 may be outside of pixel circuit 200. That is, such a pixel circuit may include no comparator. For example, multiple such pixel circuits may be provided that share one or more comparators outside of the pixel circuits.

Pixel circuit 200 further includes a reset device (labeled as "S1" in FIG. 2) electrically coupled between in and out of CG amp. The reset device S1 may reset CG amp in response to the trigger signal being generated. As shown in FIG. 2, S1 may comprise a switch. The voltage between the input ("in") and output ("out") of CG amp may be reset by closing the switch of the reset device S1. In some embodiments, S1 may reset CG amp by setting a voltage between in and out of CG amp to zero. In some embodiments, when comp1 or comp2 output a trigger signal to an external readout system, the external readout system may send an acknowledge signal to pixel circuit 200 in response to receiving the trigger signal. Upon receiving the acknowledge signal, pixel circuit 200 may generate a reset signal (labeled as "reset" in FIG. 2) to close the switch of the reset device S1 and reset the controlled-gain amplifier CG amp. After resetting CG amp, pixel circuit 200 is ready to detect a new event. In some embodiments, when comp1 or comp2 output a trigger signal to an external readout system, pixel circuit 200 may generate reset to close the switch of the reset device S1 and reset the controlled-gain amplifier CG amp without regard to the receipt of the acknowledge signal. For example, pixel circuit 200 may generate reset substantially at the same time as comp1 or comp2 outputting the trigger signal, or within a predetermined time period after comp1 or comp2 outputting the trigger signal.

As shown in FIG. 2, pixel circuit 200 has no feedback (and no capacitive feedback) between out and in of the controlled-gain amplifier CG amp (i.e. there is no capacitor placed and connected between output and input of the amplifier). Thus, the amplification of $V_{PR}$ does not depend on any feedback configuration or capacitance ratio, as required by the above-noted extant solutions. Instead, CG amp is designed as an amplifier with well-controlled and well-matching gain (e.g., with magnitude being of the order of 20), while permitting the ability to optimally use advanced semiconductor fabrication process technologies for implementing a vision sensor with competitive pixel sizes.

In FIG. 2, before the controlled-gain amplifier CG amp is reset, the capacitor $C_c$ may store electric charges based on (e.g., proportional to or in logarithmic relation to) an instantaneous value of $I_{ph}$. $C_c$ may decouple $V_{PR}$ from in of CG amp, which may allow setting an operating point of CG amp independently from the value of $I_{ph}$. Because the capacitor $C_c$ is irrelevant to the gain of CG amp, it can be configured to have a size much smaller than capacitors in extant solutions, such as those noted above. In this way, the overall size of pixel circuit 200 may be greatly decreased, and the pixel density of the vision sensor may be greatly increased.

In some embodiments, before being provided as input to the comparator(s) (e.g., comp1 or comp2), the amplified signal generated by the controlled-gain amplifier CG amp may be adjusted to suppress a charge injection effect, which may be caused by parasitic parameters (e.g., stray capacitance) associated with e.g. transistors or interconnect wires. For this purpose, in some embodiments, another capacitor may be arranged between out of CG amp and the input of the comparator(s), as further described below with reference to FIG. 3.

Figure 3:
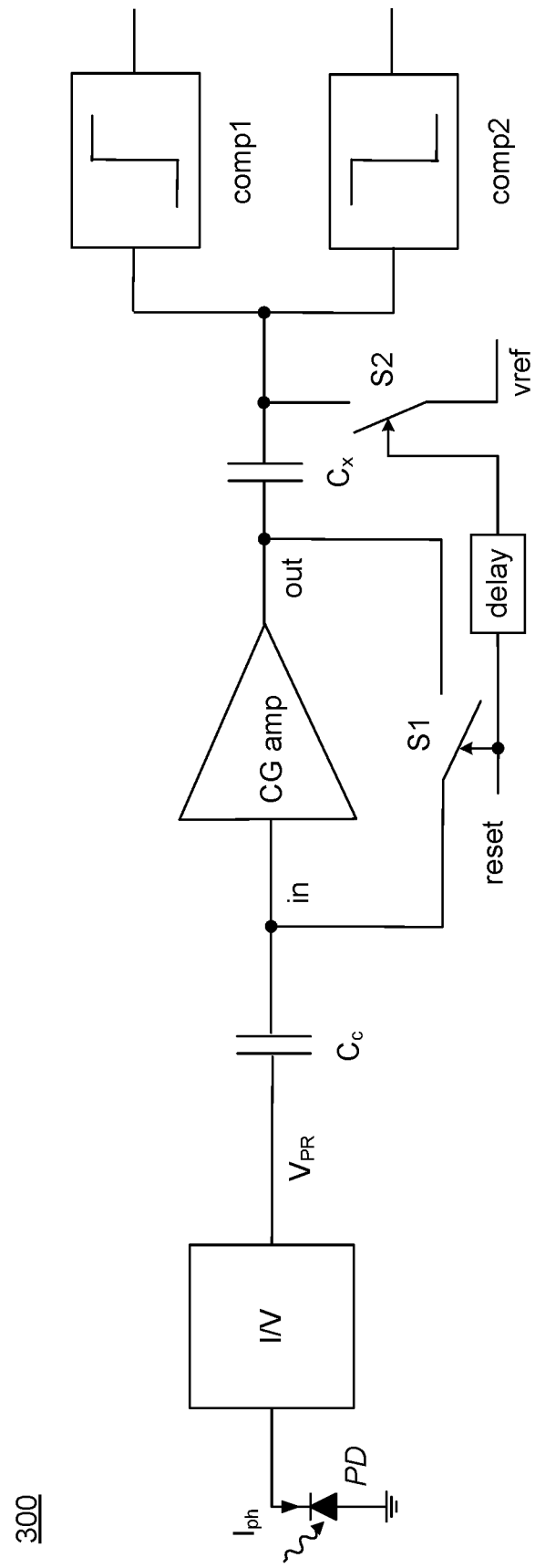
FIG. 3 is a schematic representation of another exemplary pixel circuit, according to embodiments of the present disclosure.

FIG. 3 is a schematic representation of an exemplary pixel circuit 300, according to embodiments of the present disclosure. Pixel circuit 300 may be similar to pixel circuit 200, described above. However, compared with pixel circuit 200, pixel circuit 300 includes another capacitor $C_x$ electrically coupled in series between out of CG amp and the input (labeled as "inc") of the comparator(s) (e.g., comp1 and comp2). The capacitance of $C_x$ can be arbitrary. In some embodiments, the capacitance of $C_x$ may be configured to be a small value, thus reducing its size.

Also, pixel circuit 300 further includes another reset device S2. As shown in FIG. 3, S2 includes a switch that is electrically coupled between inc and a reference signal, e.g., a reference voltage signal (labeled as "vref" in FIG. 3). In some embodiments, S1 and S2 may be implemented differently (e.g., with different switches). When CG amp is being reset, S2 may be electrically switched to reset inc to vref. For example, if the reset device S2 is a switch, the switch of S2 may be closed to reset inc to vref. In some embodiments, vref may be configured to accommodate the input requirement(s) of the comparators comp1 and comp2.

By including $C_x$ and S2, voltage headroom and dynamic range of pixel circuit 300 may be optimized. Also, the design of pixel circuit 300 may reduce the charge injection effect on in of CG amp caused by S1, especially if S1 is a single CMOS transistor.

In some embodiments, for better suppression of the charge injection effect into the amplifier input node, S1 may be electrically reset before S2. For doing so, pixel circuit 300 may include a delay circuit (e.g., labeled as "delay" in FIG. 3) that is electrically coupled between reset devices S1 and S2. The delay circuit may set a temporal delay between the delivery of the switching signals to S1 and S2. In some embodiments, for each reset switching operation, S1 may be switched opened (and thus complete its reset operation) shortly before S2. An example of this sequence is further described below with reference to FIG. 5.

In some embodiments, CG amp may be an amplifier configured with a specific gain. For example, the specific gain may be a negative gain (e.g., −1, −5, −10, −20, −30, or the like). In some embodiments, the gain of CG amp may be varied during operation. In some embodiments, CG amp may be implemented using multiple stacked transistors and/or multiple stages of the circuit connected in series to achieve a higher gain. Example embodiments of CG amp are further described below.

Figure 4A:
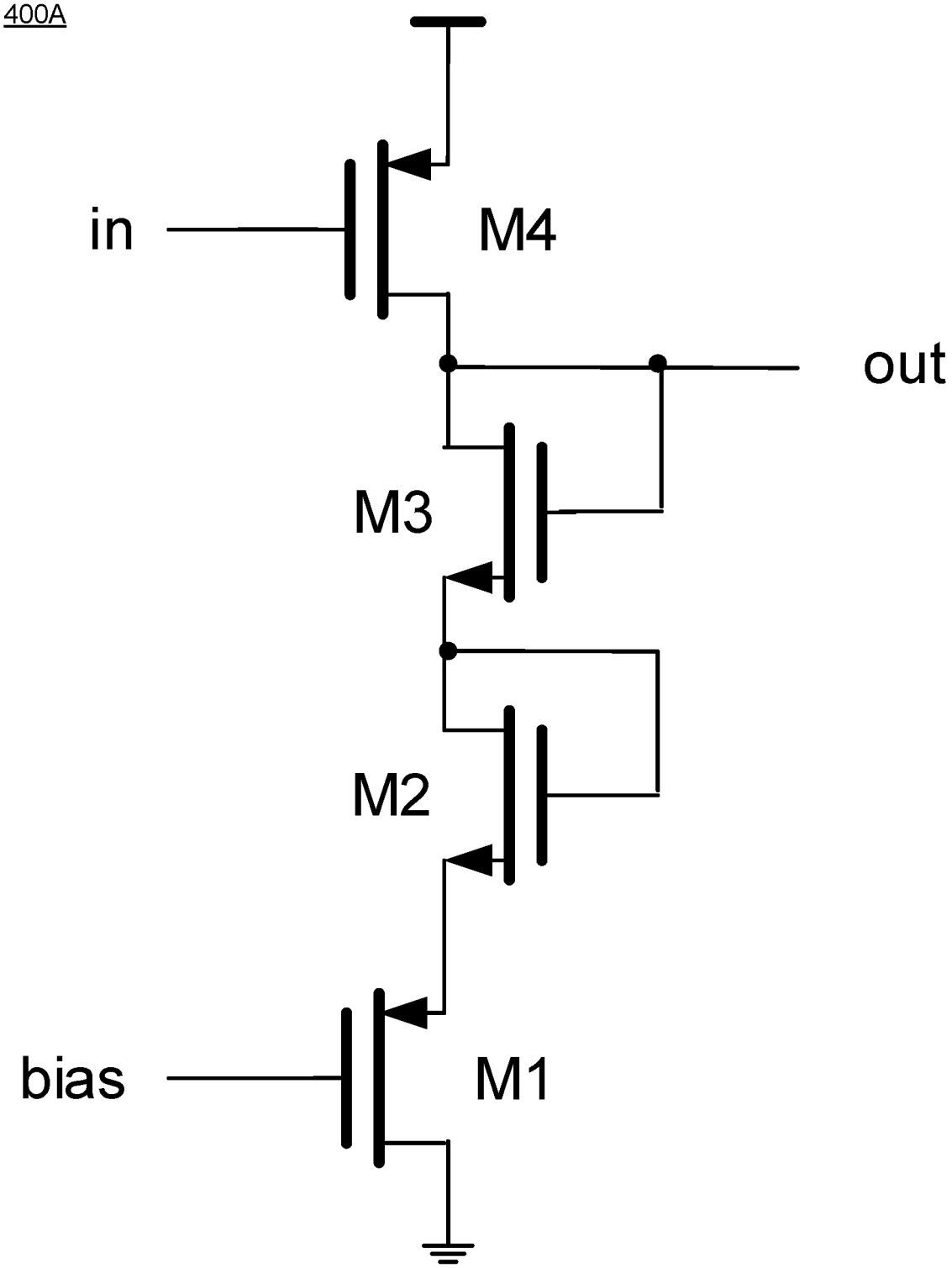
FIG. 4A is a schematic representation of an exemplary amplifier, according to embodiments of the present disclosure.
Figure 4B:
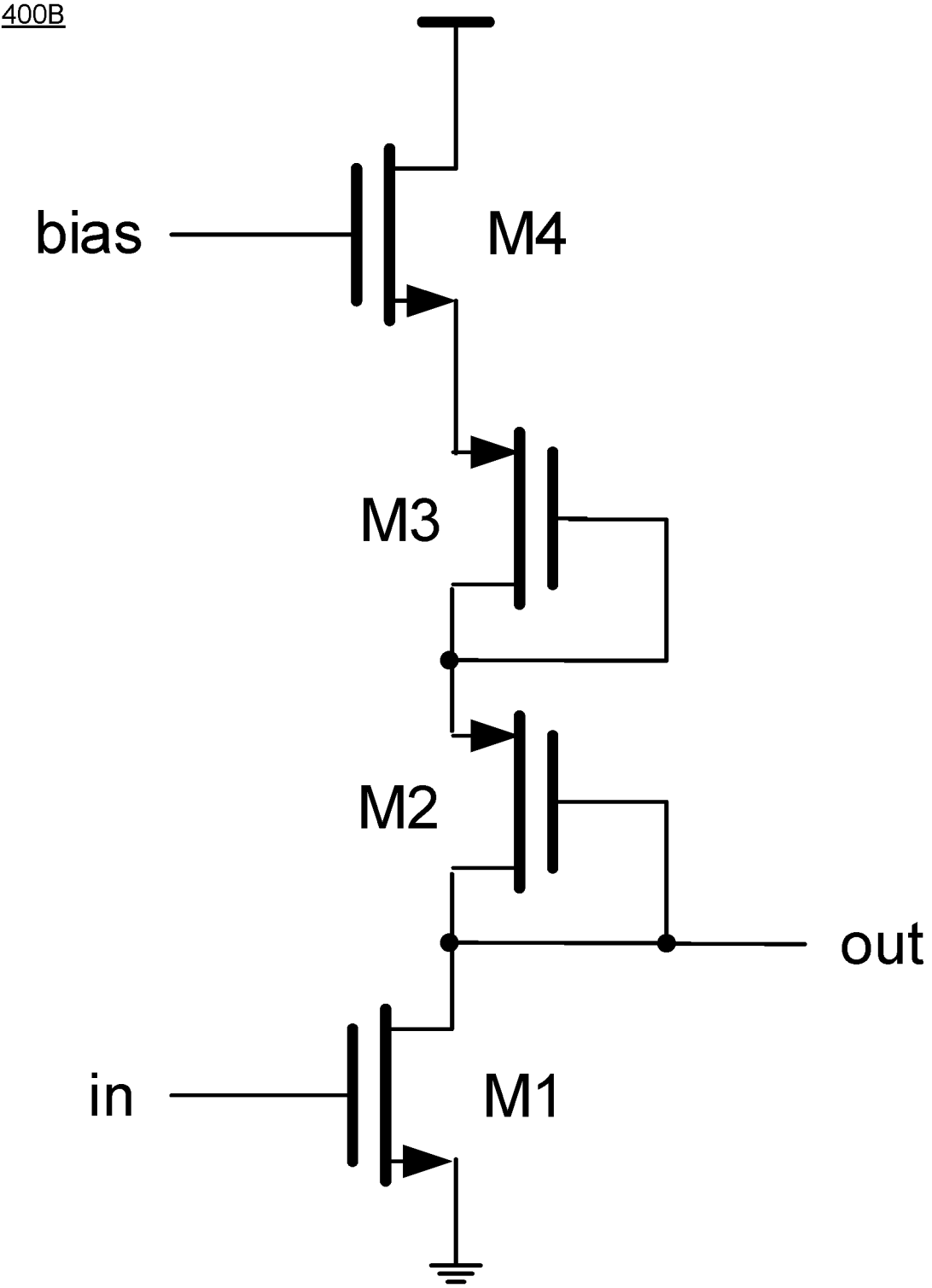
FIG. 4B is a schematic representation of another exemplary amplifier, according to embodiments of the present disclosure.
Figure 4C:
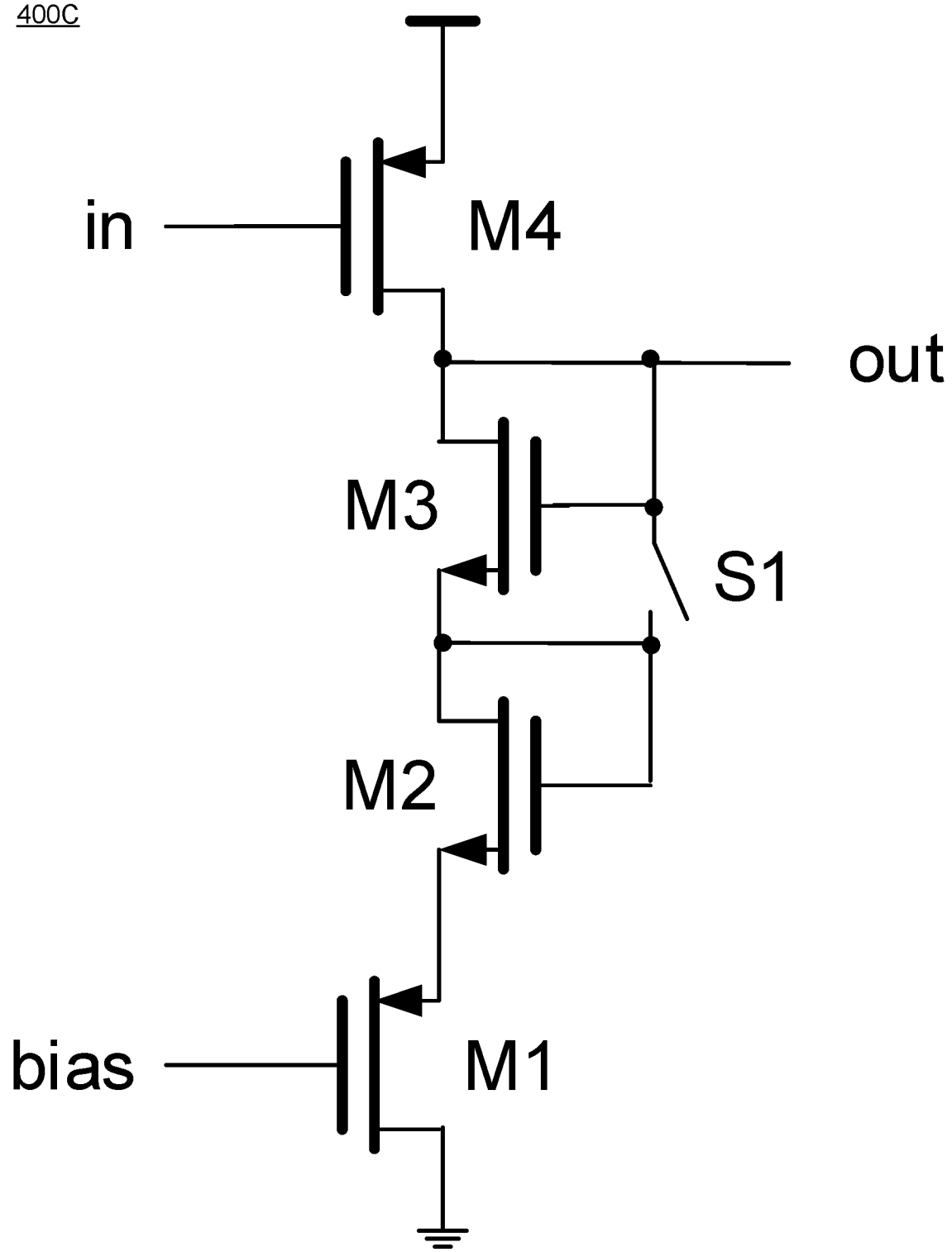
FIG. 4C is a schematic representation of an exemplary amplifier with an adjustable open-loop gain, according to embodiments of the present disclosure.
Figure 4D:
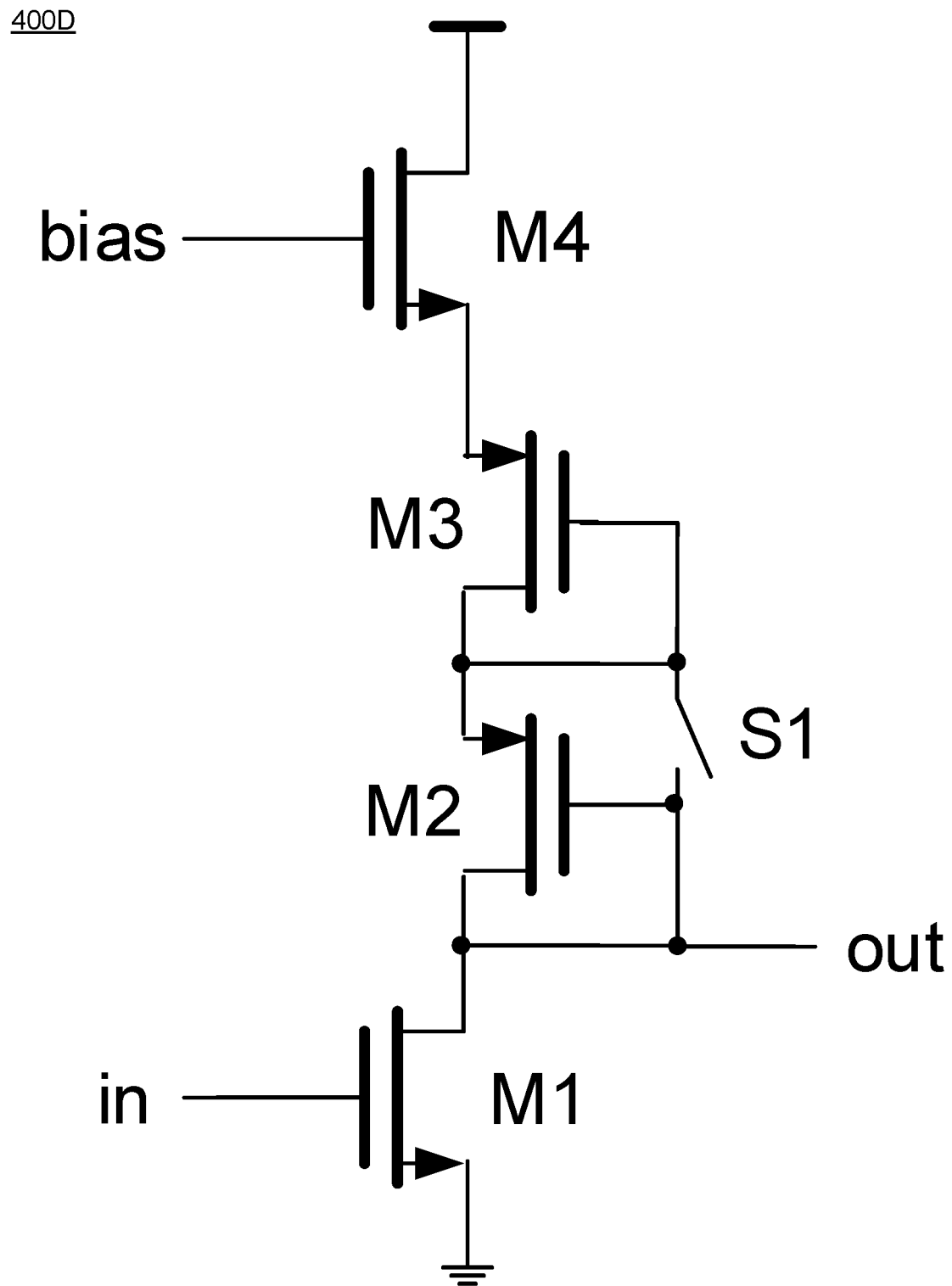
FIG. 4D is a schematic representation of yet another exemplary amplifier with an adjustable open-loop gain, according to embodiments of the present disclosure.

FIGS. 4A-4B show schematic representations of exemplary amplifiers 400A and 400B, according to embodiments of the present disclosure. FIGS. 4C-4D show schematic representations of exemplary amplifiers 400C and 400D, which have adjustable open-loop gains, according to embodiments of the present disclosure. As shown in FIGS. 4A-4D, amplifiers 400A-400D include multiple stacked transistors, represented by M1, M2, M3, and M4. In FIGS. 4A-4D, M2, M3 are diode-connected, with M2 having its gate electrically coupled to its drain, and M3 having its gate electrically coupled to its drain. In amplifiers 400A and 400C, M2 and M3 may be NMOS-type transistors, and M2 and M4 may be PMOS-type transistors. In amplifiers 400B and 400D, M2 and M3 may be PMOS-type transistors, and M1 and M4 may be NMOS-type transistors.

In FIG. 4A, a bias voltage (labeled as "bias") may be used to adjust an input voltage level (labeled as "in") of amplifier 400A. For example, the input voltage level may be adjusted to be equal to an output voltage (labeled as "out") at an operating point of amplifier 400A. In some embodiments, an open-loop gain of amplifier 400A may be associated with the number of the stacked transistors. For example, in FIG. 4A, there are four stacked transistors. The gain of amplifier 400A is the number of stacked transistors minus one (i.e., amplifier 400A has a gain having a magnitude of three in FIG. 4A). In some embodiments, by using more stacked diode-connected transistors or connecting multiple stages of amplifiers similar to amplifier 400A in series, a higher-magnitude open-loop gain may be achieved. The open-loop gain of amplifier 400A may be configured to be any number in the above-described manner. In some embodiments, the open-loop gain of amplifier 400A may have a magnitude less than 100 (e.g., less than 90, 80, 70, or so on). For example, in some embodiments, a magnitude of the gain of the amplifier is greater than or equal to 20 and less than or equal to 40. By way further example, in some embodiments, a magnitude of the gain of the amplifier is less than 10. In other embodiments, a magnitude of the gain of the amplifier is equal to or greater than 10. In still further embodiments, a magnitude of the gain of the amplifier is 1 or less.

In the exemplary controlled-gain amplifier 400B of FIG. 4B, a bias voltage (labeled as "bias") may be used to adjust an input voltage level (labeled as "in") of amplifier 400B. For example, the input voltage level may be adjusted to be equal to an output voltage (labeled as "out") at an operating point of amplifier 400B. In some embodiments, similar to amplifier 400A, an open-loop gain of amplifier 400B may be associated with the number of the stacked transistors. For example, in FIG. 4B, there are four stacked transistors. The magnitude of the gain of amplifier 400B is the number of stacked transistors minus one (i.e., amplifier 400B has a gain having magnitude of three in FIG. 4B). In some embodiments, by using more stacked diode-connected transistors or connecting multiple stages of amplifiers similar to amplifier 400B in series, a higher-magnitude open-loop gain may be achieved. The open-loop gain of amplifier 400B may be configured to be any number in the above-described manner. In some embodiments, the open-loop gain of amplifier 400B may have a magnitude less than 100 (e.g., less than 90, 80, 70, or so on). For example, in some embodiments, a magnitude of the gain of the amplifier is greater than or equal to 20 and less than or equal to 40. By way further example, in some embodiments, a magnitude of the gain of the amplifier is less than 10. In other embodiments, a magnitude of the gain of the amplifier is equal to or greater than 10. In still further embodiments, a magnitude of the gain of the amplifier is 1 or less.

In FIGS. 4A-4B, the gain of amplifiers 400A and 400B may be defined by the number of stacked transistors, which is not adjustable. In some embodiments, the gain of the amplifier may be adjustable and the circuit may include switches arranged between the stacked transistors, so that the gain is controllable or adjustable by switching in or out one or more of the stacked transistors or amplifier stages. FIGS. 4C-4D shows amplifiers 400C and 400D that have adjustable open-loop gains.

As shown in FIG. 4C, amplifier 400C may be similar to amplifier 400A except the addition of a switch S1 that electrically couples the gate of M3 and the gate of M2. Further, as shown in FIG. 4D, amplifier 400D may be similar to amplifier 400B except the addition of a switch S1 that electrically couples the gate of M3 and the gate of M2. When S1 is open, amplifiers 400C and 400D may be functionally the same with amplifiers 400A and 400B, respectively. When S1 is closed, M3 may be short-circuited and bypassed in both amplifiers 400C and 400D, in which the number of stacked transistors of amplifiers 400C and 400D may be reduced by one, respectively. Consequently, the open-loop gain of amplifiers 400C and 400D may be reduced by 1 (i.e., becomes 2 from 3) when S1 is closed. By controlling opening and closing S1, stacked transistors of amplifier 400C and 400D may be switched in or out, and thus the open-loop gain of amplifier 400C and 400D may be adjustable. It is noted that other embodiments and designs for the switches may be used other than S1 in amplifiers 400C and 400D. For example, more than one switch may be used. As a further example, a switch may switch in or out more than one transistor. By designing different switches, the open-loop gain of the amplifier may be controlled or adjusted in any way that suits the application.

Figure 4E:
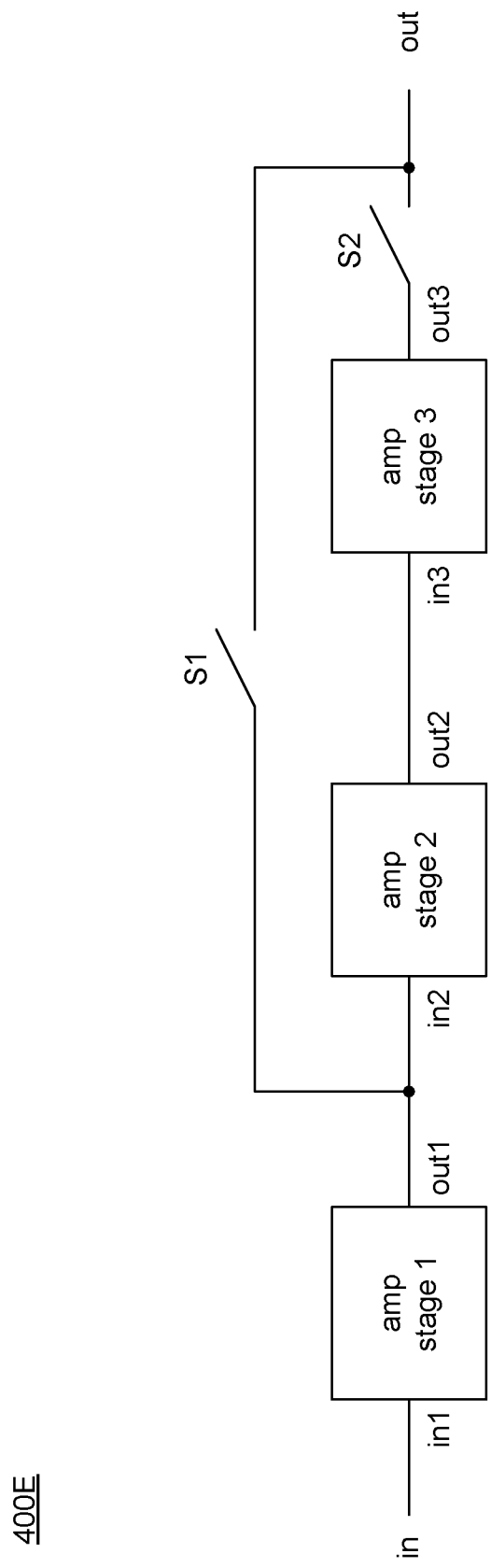
FIG. 4E is a schematic representation of an exemplary amplifier with adjustable amplifier stages, according to embodiments of the present disclosure.

FIG. 4E is a schematic representation of an exemplary amplifier 400E with adjustable amplifier stages, according to embodiments of the present disclosure. In FIG. 4E, amplifier 400E includes three stacked amplifier stages electrically coupled in series between their respective input "in" and output "out": amp stage 1 (with input "in1" and output "out1"), amp stage 2 (with input "in2" and output "out2"), and amp stage 3 (with input "in3" and output "out3"). In some embodiments, one or more of amp stage 1, amp stage 2, and amp stage 3 may be any of amplifiers 400A to 400D. As shown in FIG. 4E, amplifier 400E includes two switches S1 and S2. The gain of amplifier 400E (i.e., the gain between in and out) may be adjusted by controlling the opening and closing of S1 and S2. For example, if S2 is closed (connecting out3 and out) and S1 is open, then all of amp stage 1, amp stage 2, and amp stage 3 are switched in series between in and out, and the gain of amplifier 400E is the product of the gains of amp stage 1, amp stage 2, and amp stage 3. As another example, if S2 is open and S1 is closed (connecting out/and out), then amp stage 2 and amp stage 3 are short-circuited and bypassed, leaving only amp stage 1 functioning between in and out in amplifier 400E. In this case, the gain of amplifier 400E is adjusted to be equal to the gain of amp stage 1.

By using the design of FIG. 4A or FIG. 4B, a high-accuracy gain of amplifier 400A or 400B may be achieved. For example, amplifier 400A (or amplifier 400B) has a gain of magnitude three (e.g., −3). If, for example, a gain of negative four is needed, it could be achieved by stacking an additional transistor to amplifier 400A (or amplifier 400B). By using the design of FIG. 4C or FIG. 4D, an amplifier 400C or 400D with an adjustable or controllable gain may be achieved. For example, amplifier 400C (or amplifier 400D) has a gain of magnitude three (e.g., −3) when S1 is open. If, for example, a gain of negative two is needed, it can be achieved by closing S2. In some embodiments, higher-magnitude gains may be realized by connecting several amplifier stages in series, such as amplifier 400E. For example, amp stage 1, amp stage 2, and amp stage 3 of amplifier 400E may have gains 2, 4, 3, respectively, and if S2 is closed and S1 is open, amplifier 400E may have an overall gain of 24. Also, as shown in FIGS. 4A-4E, amplifiers 400A-400E use no capacitor or any other capacitive component. The designs of FIGS. 4A-4E allow great scalability of the circuit because, compared with capacitors, they are generally easier to downsize the transistors with the fabrication technology in a semiconductor manufacturing process.

It is noted that other designs for the amplifier may be used other than the exemplary amplifiers 400A-400E. As will be appreciated, embodiments of the present disclosure are not limited to these examples and other embodiments of the amplifier may be implemented in view of the present disclosure.

Figure 5:
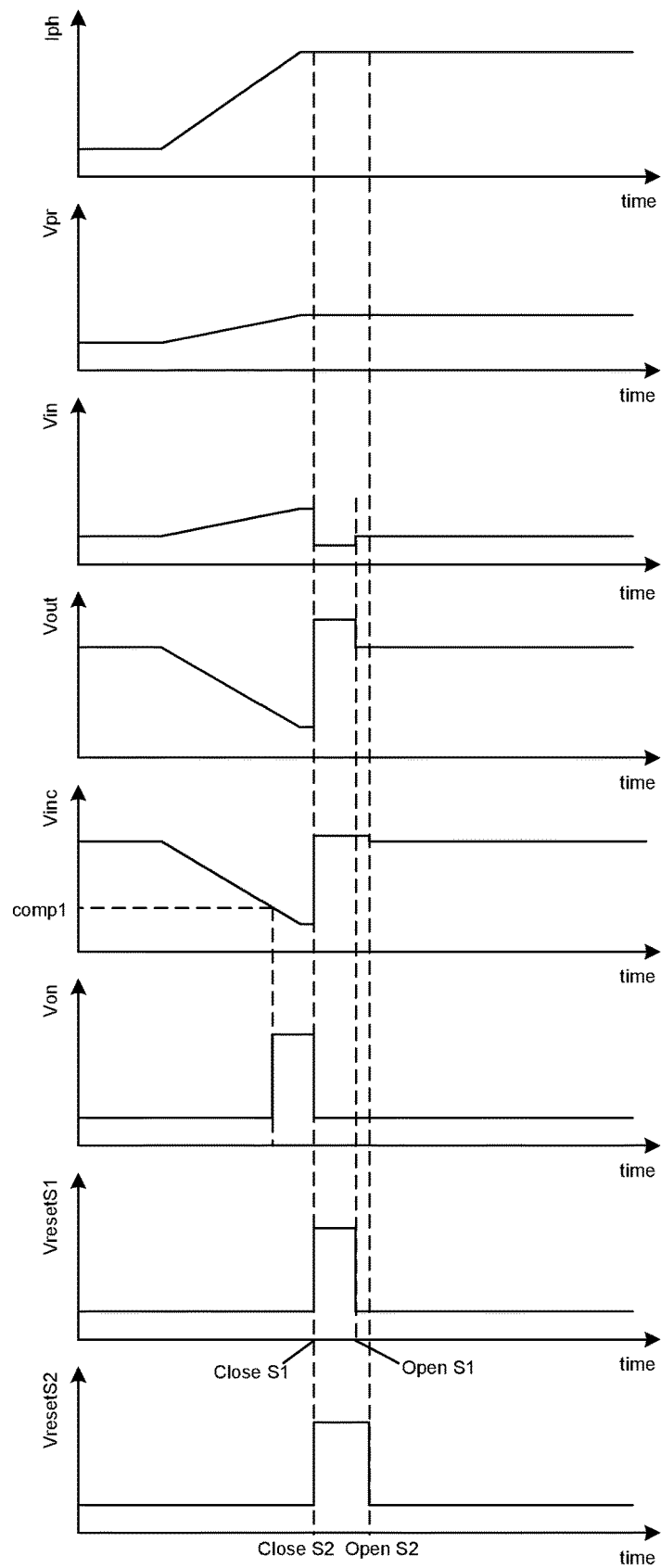
FIG. 5 is an example signal timing diagram of the pixel circuit of FIG. 3, according to embodiments of the present disclosure.

FIG. 5 is an example signal timing diagram of the pixel circuit of FIG. 3, according to embodiments of the present disclosure. FIG. 5 shows an operation phase (e.g., for event detection) and a reset phase (e.g., for resetting the pixel circuit to prepare for next event detection) of waveforms of the signals in pixel circuit 300.

During the operation phase, as shown in FIG. 5 in view of FIG. 3, $I_{ph}$ starts to change at time T1 in response to the brightness of the light impinging on PD, which leads to changes of $V_{PR}$, a voltage at in of CG amp (labeled as "$V_{in}$"), a voltage at out of CG amp (labeled as "$V_{out}$"), and a voltage at inc (labeled as "$V_{inc}$"). Assuming comp1 in FIG. 3 has a threshold value $TH_{comp1}$, if Vino crosses $TH_{comp1}$ at time T2, comp1 may generate a trigger signal $V_{on}$ indicating that a change in the brightness detected by PD satisfies a definition of an event.

During the reset phase, as shown in FIG. 5 in view of FIG. 3, S1 may receive a resetting signal ("reset" in FIG. 3, labeled as "$V_{resetS1}$" in FIG. 5) at time T3. Once receiving $V_{resetS1}$, S1 may be electrically switched to set $V_{in}$ to be $V_{out}$. S2 may also receive a resetting signal (labeled as "$V_{resetS2}$") at time T3. Once receiving $V_{resetS2}$, S2 may be electrically switched to set $V_{inc}$ to vref as shown in FIG. 3. At T3, comp1 may stop outputting the trigger signal, in which $V_{on}$ is set back to 0. At time T4, S1 may be electrically disconnected (i.e., opened) to complete the resetting of CG amp. At time T5, S2 may be electrically disconnected (i.e., opened) to complete the resetting of $C_x$ and inc.

Figure 6:
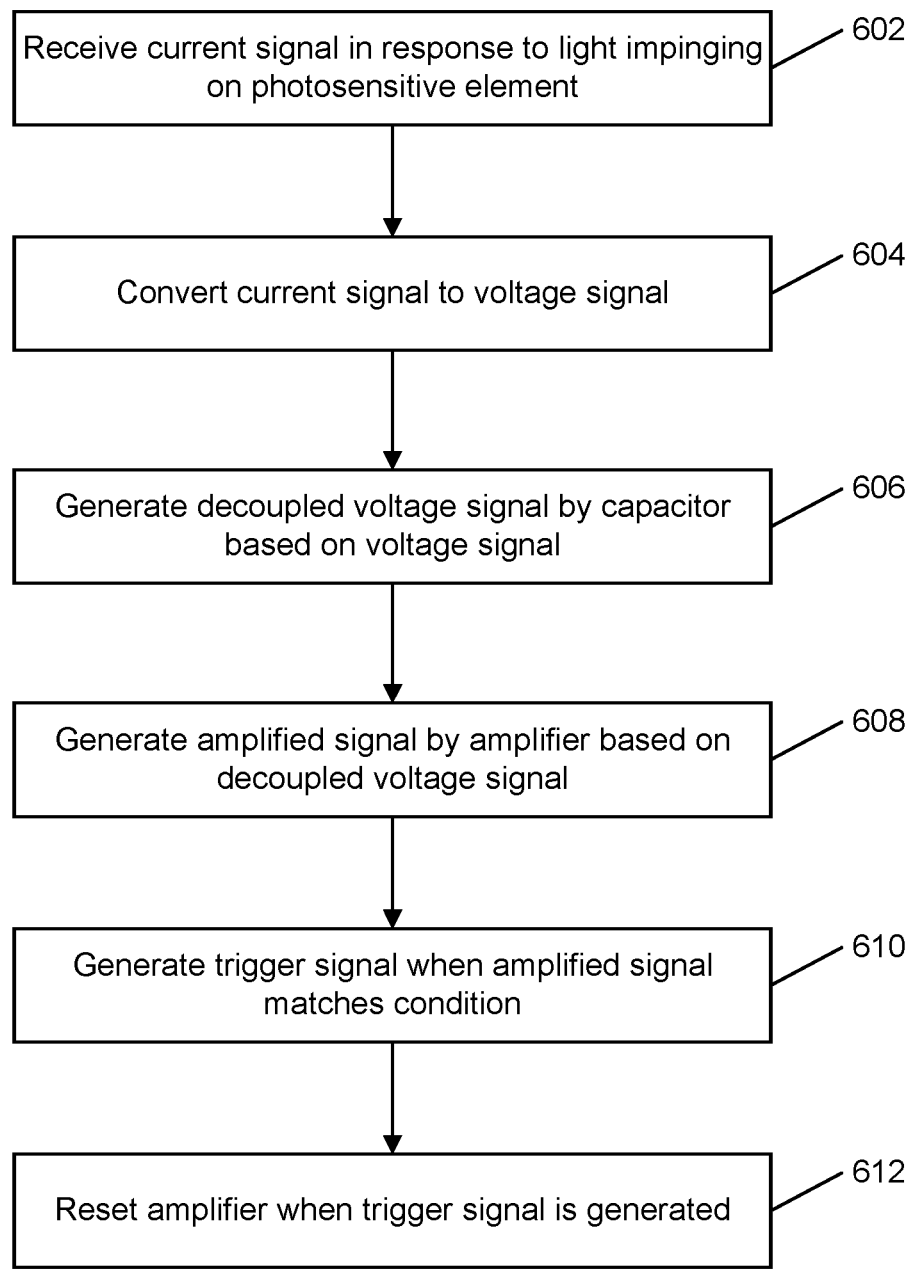
FIG. 6 is a flowchart of an exemplary method for controlling an image sensor, according to embodiments of the present disclosure.

FIG. 6 is a flowchart of an exemplary method 600 for controlling a sensor, according to embodiments of the present disclosure. In some embodiments, the sensor may be at least one of a temporal contrast (TC) sensor. The sensor may include a pixel circuit (e.g., pixel circuit 200 or 300). In some embodiments, method 600 of FIG. 6 may be performed with the pixel circuit.

At step 602, the pixel circuit receives a current signal (e.g., $I_{ph}$ in FIGS. 2-3) in response to light impinging on a photosensitive element (e.g., PD in FIGS. 2-3). For example, the current signal may be received from PD of pixel circuit 200 or 300.

At step 604, the pixel circuit converts the current signal to a voltage signal (e.g., $V_{PR}$ in FIGS. 2-3). The voltage signal may be generated based on (e.g., proportional to or in a logarithmic relation to) the current signal. For example, the current signal may be converted by the current-to-voltage converter I/V of pixel circuit 200 or 300.

At step 606, the pixel circuit generates a decoupled voltage signal (e.g., $V_{in}$ in FIG. 5) by a first capacitor (e.g., $C_c$ in FIGS. 2-3) based on the voltage signal. The decoupled voltage signal may be decoupled from the current signal.

At step 608, the pixel circuit generates an amplified signal (e.g., $V_{out}$ in FIG. 5) by an amplifier (e.g., the controlled-gain amplifier CG amp in FIGS. 2-3, or any of the exemplary amplifiers 400A-400E in FIGS. 4A-4E) based on the decoupled voltage signal. There is no capacitive feedback between the amplified signal and the decoupled voltage signal.

At step 610, the pixel circuit generates a trigger signal (e.g., $V_{on}$ in FIG. 5) when the amplified signal matches a condition. For example, the trigger signal may be generated by one or more comparators (e.g., comp1 and comp2 of pixel circuit 200 or 300) of the pixel circuit. In some embodiments, the condition may be that a magnitude of the amplified signal is greater than or equal to a threshold value (e.g., $TH_{comp1}$ in FIG. 5). In some embodiments, the pixel circuit may further output the trigger signal to an external readout system.

At step 612, the pixel circuit resets the amplifier when the trigger signal is generated. For example, the pixel circuit may close a switch (e.g., a first switch S1 of pixel circuit 200 or 300) electrically coupled between the input (e.g., in of pixel circuit 200 or 300) and the output (e.g., out of pixel circuit 200 or 300) of the amplifier (e.g., CG amp). In some embodiments, the pixel circuit may receive an acknowledge signal from the external readout system after outputting the trigger signal, and then reset the amplifier.

In some embodiments, method 600 may further include resetting another switch (e.g., a second switch S2 of pixel circuit 200 or 300) electrically coupled between a reference signal (e.g., vref in FIG. 3) and an input of the comparators (e.g., inc of comp1 and comp2 of pixel circuit 300) for generating the trigger signal, wherein another capacitor is electrically coupled in series between the amplifier (e.g., CG amp) and the input of the comparators.

Further, in some embodiments, method 600 may include opening the another switch (e.g., S2) later than opening the switch (e.g., S1) after resetting the amplifier. For example, the pixel circuit may set a temporal delay between switching the first switch S1 and the second switch S2 using a delay circuit (e.g., delay of pixel circuit 300) electrically coupled between S1 and S2.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed:

1. An event-based vision sensor that includes a plurality of pixels, each pixel comprising:
    a photosensitive element configured to generate a current signal in response to brightness of light impinging on the photosensitive element;
    a converter configured to receive the current signal from the photosensitive element and generate a voltage signal based on the received current signal;
    a capacitor electrically coupled to the converter in series and configured to receive the voltage signal from the converter;
    an open-loop amplifier electrically coupled, at an input, to the capacitor in series and configured to generate, at an output, an amplified signal based on an output signal from the capacitor, wherein there is no feedback between the output and the input of the open-loop amplifier, and further wherein the open-loop amplifier comprises a plurality of stacked transistors providing a well-controlled and high-accuracy open-loop gain of the open-loop amplifier, wherein a gate of at least one of the plurality of stacked transistors is configured to receive a bias voltage that sets an operation point of the open-loop amplifier; and
    a reset device electrically coupled between the input and the output of the open-loop amplifier and configured to reset the open-loop amplifier in response to a trigger signal being generated.

2. The event-based vision sensor of claim 1, wherein the plurality of stacked transistors comprises a first transistor and a second transistor, a source of the first transistor is electrically coupled to a source of the second transistor, and a gate of the first transistor is configured to receive the bias voltage.

3. The event-based vision sensor of claim 1, wherein the plurality of stacked transistors comprises a transistor, a gate of the transistor is electrically coupled to a drain of the transistor or a source of the transistor, and the open-loop gain of the open-loop amplifier is associated with a number of the plurality of stacked transistors.

4. The event-based vision sensor of claim 1, wherein the open-loop gain of the open-loop amplifier is adjustable.

5. The event-based vision sensor of claim 4, wherein the open-loop gain of the open-loop amplifier is adjustable by switching in or out one or more of the transistors of the plurality of stacked transistors.

6. The event-based vision sensor of claim 1, wherein each pixel further comprises:
    a comparator electrically coupled to the output of the open-loop amplifier and configured to generate the trigger signal when the amplified signal matches a condition, and further wherein the condition comprises that a magnitude of the amplified signal is greater than or equal to a threshold value.

7. The event-based vision sensor of claim 6, wherein the comparator is further configured to output the trigger signal to an external readout system.

8. The event-based vision sensor of claim 7, wherein the external readout system is configured to send an acknowledge signal to the pixel in response to the trigger signal, and the reset device is further configured to reset the open-loop amplifier in response to the acknowledge signal.

9. The event-based vision sensor of claim 7, wherein the reset device is further configured to reset the open-loop amplifier after the comparator outputs the trigger signal and without regard to the receipt of an acknowledge signal from the external readout system.

10. The event-based vision sensor of claim 6, further comprising:
    another capacitor electrically and directly coupled in series between the output of the open-loop amplifier and an input of the comparator; and
    another reset device electrically coupled to the input of the comparator and configured to set a reference signal as the input of the comparator.

11. The event-based vision sensor of claim 10, wherein the another reset device is further configured to set the reference signal as the input of the comparator by activating the another reset device.

12. The event-based vision sensor of claim 11, wherein a switch is closed to activate the another reset device.

13. The event-based vision sensor of claim 10, further comprising:
a delay circuit electrically coupled between the reset device and the another reset device and configured to set a temporal delay between operating the reset device and the another reset device.

14. The event-based vision sensor of claim 10, wherein the reference signal comprises a reference voltage.

15. The event-based vision sensor of claim 1, wherein there is no capacitor between the input and the output of the open-loop amplifier.

16. The event-based vision sensor of claim 1, wherein the sensor comprises at least one temporal contrast sensor.

17. The event-based vision sensor of claim 1, wherein a magnitude of the open-loop gain of the open-loop amplifier is less than 100.

18. The event-based vision sensor of claim 1, wherein the reset device is further configured to reset the open-loop amplifier by setting a voltage between the input and the output of the amplifier to zero.

19. The event-based vision sensor of claim 10, wherein the another reset device is further configured to reset the amplified signal to the reference signal decoupled from the open-loop amplifier.

20. The event-based vision sensor of claim 1, wherein the plurality of stacked transistors are connected between a supply voltage and ground.

21. A pixel circuit for use with an event-based vision sensor, the pixel circuit comprising:
a photosensitive element configured to generate a current signal in response to brightness of light impinging on the photosensitive element;
a converter configured to receive the current signal from the photosensitive element and generate a voltage signal based on the received current signal;
a capacitor electrically coupled to the converter in series and configured to receive the voltage signal from the converter;
an open-loop amplifier electrically coupled, at an input, to the capacitor in series and configured to generate, at an output, an amplified signal based on an output signal from the capacitor, wherein there is no feedback between the output and the input of the open-loop amplifier, and further wherein the open-loop amplifier comprises a plurality of stacked transistors providing a well-controlled and high-accuracy open-loop gain of the open-loop amplifier, wherein a gate of at least one of the plurality of stacked transistors is configured to receive a bias voltage that sets an operation point of the open-loop amplifier; and
a reset device electrically coupled between the input and the output of the open-loop amplifier and configured to reset the open-loop amplifier when a trigger signal is generated.

22. The pixel circuit of claim 21, wherein there is no capacitive feedback between the output and the input of the open-loop amplifier.

23. The pixel circuit of claim 21, further comprising a comparator electrically coupled to the output of the open-loop amplifier and configured to generate the trigger signal when the amplified signal matches a condition.

24. The pixel circuit of claim 21, wherein the plurality of stacked transistors comprises a first transistor and a second transistor, a source of the first transistor is electrically coupled to a source of the second transistor, and a gate of the first transistor is configured to receive the bias voltage.

25. The pixel circuit of claim 21, wherein the plurality of stacked transistors comprises a transistor, a gate of the transistor is electrically coupled to a drain of the transistor or a source of the transistor, and the open-loop gain of the open-loop amplifier is associated with a number of the transistors of the plurality of stacked transistors.

26. The pixel circuit of claim 21, wherein the plurality of stacked transistors are connected between a supply voltage and ground.

27. A method for controlling an event-based vision sensor including a plurality of pixels, comprising:
receiving a current signal in response to light impinging on a photosensitive element;
converting the current signal to a voltage signal;
generating a decoupled voltage signal by a capacitor based on the voltage signal, wherein the decoupled voltage signal is decoupled from the current signal;
generating an amplified signal by an open-loop amplifier based on the decoupled voltage signal, wherein there is no capacitive feedback between the amplified signal and the decoupled voltage signal, and further wherein the open-loop amplifier comprises a plurality of stacked transistors providing a well-controlled and high-accuracy open-loop gain of the open-loop amplifier, wherein a gate of at least one of the plurality of stacked transistors is configured to receive a bias voltage that sets an operation point of the open-loop amplifier;
generating a trigger signal when the amplified signal matches a condition; and
resetting the open-loop amplifier when the trigger signal is generated.

28. The method of claim 27, wherein the plurality of stacked transistors comprises a first transistor and a second transistor, a source of the first transistor is electrically coupled to a source of the second transistor, and a gate of the first transistor is configured to receive the bias voltage.

29. The method of claim 27, wherein the plurality of stacked transistors comprise a transistor, a gate of the transistor is electrically coupled to a drain of the transistor or a source of the transistor, and the open-loop gain of the open-loop amplifier is associated with a number of the transistors of the plurality of stacked transistors.

30. The method of claim 27, wherein the open-loop gain of the open-loop amplifier is adjustable.

31. The method of claim 30, further comprising:
adjusting the open-loop gain of the open-loop amplifier by switching in or out one or more of the transistors of the plurality of stacked transistors.

32. The method of claim 27, further comprising:
outputting the trigger signal to an external readout system.

33. The method of claim 32, further comprising:
receiving an acknowledge signal from the external readout system after outputting the trigger signal; and
resetting the open-loop amplifier.

34. The method of claim 32, further comprising:
resetting the open-loop amplifier after outputting the trigger signal and without regard to the receipt of an acknowledge signal from the external readout system.

35. The method of claim 27, wherein resetting the open-loop amplifier comprises:
resetting the amplified signal to a reference signal decoupled from the open-loop amplifier.

36. The method of claim 35, wherein the resetting the amplified signal to the reference signal comprises:

activating a reset device electrically coupled between the reference signal and an input of a comparator for generating the trigger signal, wherein another capacitor is electrically and directly coupled in series between the open-loop amplifier and the input of the comparator.

37. The method of claim 36, further comprising:
setting a temporal delay between operating another reset device and the reset device using a delay circuit electrically coupled between the reset device and the another reset device.

38. The method of claim 35, wherein the reference signal comprises a reference voltage.

39. The method of claim 27, wherein the sensor comprises at least one temporal contrast sensor.

40. The method of claim 27, wherein a magnitude of the open-loop gain of the open-loop amplifier is less than 100.

41. The method of claim 27, wherein generating the trigger signal when the amplified signal matches the condition comprises:
generating the trigger signal when a magnitude of the amplified signal is greater than or equal to a threshold value.

42. The method of claim 27, wherein resetting the open-loop amplifier comprises activating a reset device electrically coupled between the input and the output of the open-loop amplifier.

43. The method of claim 27, wherein resetting the open-loop amplifier comprises setting a voltage between the input and the output of the open-loop amplifier to zero.

44. The method of claim 27, wherein the plurality of stacked transistors are connected between a supply voltage and ground.

* * * * *

UNITED STATES PATENT AND TRADEMARK OFFICE
CERTIFICATE OF CORRECTION

| | | |
|---|---|---|
| PATENT NO. | : 11,885,673 B2 | |
| APPLICATION NO. | : 17/220761 | |
| DATED | : January 30, 2024 | |
| INVENTOR(S) | : Daniel Matolin et al. | |

It is certified that error appears in the above-identified patent and that said Letters Patent is hereby corrected as shown below:

On the Title Page

(72) Inventors, "Denis Bourke, Dalkey (IR)" should read -- Denis Bourke, Dalkey (IE) --.

Signed and Sealed this
Twenty-sixth Day of March, 2024

Katherine Kelly Vidal
*Director of the United States Patent and Trademark Office*